United States Patent
Reichardt et al.

(10) Patent No.: US 9,118,958 B2
(45) Date of Patent: Aug. 25, 2015

(54) SYSTEMS AND METHODS FOR COORDINATING INTERACTIVE AND PASSIVE ADVERTISEMENT AND MERCHANDISING OPPORTUNITIES

(75) Inventors: M. Scott Reichardt, Tulsa, OK (US); W. Benjamin Herrington, Tulsa, OK (US)

(73) Assignee: Rovi Guides, Inc., Santa Clara, CA (US)

( * ) Notice: Subject to any disclaimer, the term of this patent is extended or adjusted under 35 U.S.C. 154(b) by 14 days.

(21) Appl. No.: 13/290,449

(22) Filed: Nov. 7, 2011

(65) Prior Publication Data

US 2012/0054787 A1 Mar. 1, 2012

Related U.S. Application Data

(63) Continuation of application No. 12/775,974, filed on May 7, 2010, which is a continuation of application No. 09/731,115, filed on Dec. 6, 2000, now abandoned.

(60) Provisional application No. 60/170,060, filed on Dec. 10, 1999.

(51) Int. Cl.
| | | |
|---|---|---|
| H04N 21/431 | (2011.01) | |
| G06Q 30/02 | (2012.01) | |
| G06Q 30/06 | (2012.01) | |

(Continued)

(52) U.S. Cl.
CPC ....... *H04N 21/4316* (2013.01); *G06Q 30/0241* (2013.01); *G06Q 30/0277* (2013.01); *G06Q 30/0601* (2013.01); *H04N 5/4401* (2013.01); *H04N 5/44543* (2013.01); *H04N 7/16* (2013.01); *H04N 21/4314* (2013.01); *H04N 21/4622* (2013.01); *H04N 21/478* (2013.01);

(Continued)

(58) Field of Classification Search
CPC ........................................ H04N 7/163
USPC ..................... 725/0.025; 715/234
See application file for complete search history.

(56) References Cited

U.S. PATENT DOCUMENTS

| | | | |
|---|---|---|---|
| 3,729,851 | A | 5/1973 | Garcia |
| 4,024,401 | A | 5/1977 | Bernstein et al. |

(Continued)

FOREIGN PATENT DOCUMENTS

| | | |
|---|---|---|
| CN | 1567986 | 1/2005 |
| DE | 31 51 492 | 7/1983 |

(Continued)

OTHER PUBLICATIONS

"Addressable Converters: A New Development at CableData," *Via Cable*, vol. 1, No. 12 (Dec. 1981).

(Continued)

*Primary Examiner* — Brian Yenke
*Assistant Examiner* — Sihar Karwan
(74) *Attorney, Agent, or Firm* — Ropes & Gray LLP

(57) ABSTRACT

Systems and methods for providing enhanced advertising and merchandising opportunities are described. Advertisements may be provided for passive programming such as television programs, commercials, pay-per-view programs, passive video products, or other suitable passive programming. Interactive advertisements may be provided in interactive applications such as interactive television program guides, web browsers, home shopping applications, operating systems, or other suitable interactive applications.

18 Claims, 29 Drawing Sheets

(51) Int. Cl.
    *H04N 5/44*      (2011.01)
    *H04N 5/445*     (2011.01)
    *H04N 7/16*      (2011.01)
    *H04N 21/462*    (2011.01)
    *H04N 21/478*    (2011.01)
    *H04N 21/482*    (2011.01)
    *H04N 21/81*     (2011.01)

(52) U.S. Cl.
    CPC ......... *H04N21/482* (2013.01); *H04N 21/4821* (2013.01); *H04N 21/812* (2013.01)

(56) References Cited

U.S. PATENT DOCUMENTS

| | | |
|---|---|---|
| 4,058,830 A | 11/1977 | Guinet et al. |
| 4,081,753 A | 3/1978 | Miller |
| 4,170,782 A | 10/1979 | Miller |
| 4,203,130 A | 5/1980 | Doumit et al. |
| 4,271,532 A | 6/1981 | Wine |
| 4,280,148 A | 7/1981 | Saxena |
| 4,367,559 A | 1/1983 | Tults |
| 4,375,651 A | 3/1983 | Templin et al. |
| 4,381,522 A | 4/1983 | Lambert |
| 4,390,901 A | 6/1983 | Keiser et al. |
| 4,425,579 A | 1/1984 | Merrell |
| 4,429,385 A | 1/1984 | Cichelli et al. |
| 4,488,179 A | 12/1984 | Kru/ ger et al. |
| 4,495,654 A | 1/1985 | Deiss |
| 4,527,194 A | 7/1985 | Sirazi |
| 4,625,080 A | 11/1986 | Scott |
| 4,641,205 A | 2/1987 | Beyers, Jr. |
| 4,685,131 A | 8/1987 | Horne |
| 4,689,022 A | 8/1987 | Peers et al. |
| 4,691,351 A | 9/1987 | Hayashi et al. |
| 4,706,121 A | 11/1987 | Young |
| 4,714,919 A | 12/1987 | Foster |
| 4,751,578 A | 6/1988 | Reiter et al. |
| 4,754,326 A | 6/1988 | Kram et al. |
| 4,761,684 A | 8/1988 | Clark et al. |
| 4,787,063 A | 11/1988 | Muguet et al. |
| 4,833,710 A | 5/1989 | Hirashima |
| 4,882,732 A | 11/1989 | Kaminaga et al. |
| 4,899,139 A | 2/1990 | Ishimochi et al. |
| 4,908,707 A | 3/1990 | Kinghorn |
| 4,908,713 A | 3/1990 | Levine |
| 4,942,391 A | 7/1990 | Kikuta |
| 4,959,719 A | 9/1990 | Strubbe et al. |
| 4,963,994 A | 10/1990 | Levine |
| 4,977,455 A | 12/1990 | Young |
| 5,003,384 A | 3/1991 | Durden et al. |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,047,867 A | 9/1991 | Strubbe et al. |
| 5,075,771 A | 12/1991 | Hashimoto |
| 5,089,885 A | 2/1992 | Clark |
| 5,090,049 A | 2/1992 | Chen |
| 5,093,718 A | 3/1992 | Hoarty et al. |
| 5,109,414 A | 4/1992 | Harvey et al. |
| 5,113,259 A | 5/1992 | Romesburg et al. |
| 5,126,851 A | 6/1992 | Yoshimura et al. |
| 5,132,992 A | 7/1992 | Yurt et al. |
| 5,151,782 A | 9/1992 | Ferraro |
| 5,151,789 A | 9/1992 | Young |
| 5,155,591 A | 10/1992 | Wachob |
| 5,170,388 A | 12/1992 | Endoh et al. |
| 5,172,413 A | 12/1992 | Bradley et al. |
| 5,179,439 A | 1/1993 | Hashimoto |
| 5,187,589 A | 2/1993 | Kono et al. |
| 5,189,630 A | 2/1993 | Barstow et al. |
| 5,191,423 A | 3/1993 | Yoshida et al. |
| 5,195,134 A | 3/1993 | Inoue et al. |
| 5,210,611 A | 5/1993 | Yee et al. |
| 5,220,420 A | 6/1993 | Hoarty et al. |
| 5,223,924 A | 6/1993 | Strubbe |
| 5,231,494 A | 7/1993 | Wachob |
| 5,231,664 A | 7/1993 | Bestler et al. |
| RE34,340 E | 8/1993 | Freeman |
| 5,233,423 A | 8/1993 | Jernigan et al. |
| 5,235,415 A | 8/1993 | Bonicel et al. |
| 5,253,066 A | 10/1993 | Vogel |
| 5,262,860 A | 11/1993 | Fitzpatrick et al. |
| 5,283,819 A | 2/1994 | Glick et al. |
| 5,285,278 A | 2/1994 | Holman |
| 5,311,423 A | 5/1994 | Clark |
| 5,317,403 A | 5/1994 | Keenan |
| 5,323,240 A | 6/1994 | Amano et al. |
| 5,325,423 A | 6/1994 | Lewis |
| 5,335,277 A | 8/1994 | Harvey et al. |
| 5,347,632 A | 9/1994 | Filepp et al. |
| 5,353,121 A | 10/1994 | Young et al. |
| 5,359,367 A | 10/1994 | Stockill et al. |
| 5,382,983 A | 1/1995 | Kwoh et al. |
| 5,396,546 A | 3/1995 | Remillard |
| 5,398,138 A | 3/1995 | Tomita |
| 5,404,393 A | 4/1995 | Remillard |
| 5,410,326 A * | 4/1995 | Goldstein ..................... 348/734 |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,432,561 A | 7/1995 | Strubbe |
| 5,442,389 A | 8/1995 | Blahut et al. |
| 5,444,499 A | 8/1995 | Saitoh |
| 5,446,919 A | 8/1995 | Wilkins |
| 5,455,570 A | 10/1995 | Cook et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,488,409 A | 1/1996 | Yuen et al. |
| 5,502,504 A | 3/1996 | Marshall et al. |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,550,863 A | 8/1996 | Yurt et al. |
| 5,559,547 A | 9/1996 | Hagar |
| 5,559,548 A | 9/1996 | Davis et al. |
| 5,559,549 A | 9/1996 | Hendricks et al. |
| 5,559,550 A | 9/1996 | Mankovitz |
| 5,561,709 A | 10/1996 | Remillard |
| 5,563,665 A | 10/1996 | Chang |
| 5,570,295 A | 10/1996 | Isenberg et al. |
| 5,572,442 A | 11/1996 | Schulhof et al. |
| 5,572,643 A | 11/1996 | Judson |
| 5,576,755 A | 11/1996 | Davis et al. |
| 5,579,239 A | 11/1996 | Freeman et al. |
| 5,583,560 A | 12/1996 | Florin et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A * | 12/1996 | Knee et al. ..................... 725/43 |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |

(56) References Cited

U.S. PATENT DOCUMENTS

| | | | |
|---|---|---|---|
| 5,617,565 A | 4/1997 | Augenbraun et al. |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,654,748 A | 8/1997 | Matthews, III |
| 5,657,072 A | 8/1997 | Aristides et al. |
| 5,659,350 A | 8/1997 | Hendricks et al. |
| 5,663,757 A | 9/1997 | Morales |
| 5,666,293 A | 9/1997 | Metz et al. |
| 5,666,645 A * | 9/1997 | Thomas et al. ............. 725/47 |
| 5,671,411 A | 9/1997 | Watts et al. |
| 5,675,390 A | 10/1997 | Schindler et al. |
| 5,677,708 A | 10/1997 | Matthews, III et al. |
| 5,677,981 A | 10/1997 | Kato et al. |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,692,214 A | 11/1997 | Levine |
| 5,694,163 A | 12/1997 | Harrison |
| 5,694,176 A | 12/1997 | Bruette et al. |
| 5,696,905 A | 12/1997 | Reimer et al. |
| 5,699,052 A | 12/1997 | Miyahara |
| 5,699,107 A | 12/1997 | Lawler et al. |
| 5,701,161 A | 12/1997 | Williams et al. |
| 5,710,601 A | 1/1998 | Marshall et al. |
| 5,710,884 A | 1/1998 | Dedrick |
| 5,717,923 A | 2/1998 | Dedrick |
| 5,722,041 A | 2/1998 | Freadman |
| 5,724,103 A | 3/1998 | Batchelor |
| 5,724,567 A | 3/1998 | Rose et al. |
| 5,731,844 A | 3/1998 | Rauch et al. |
| 5,734,853 A | 3/1998 | Hendricks et al. |
| 5,734,893 A | 3/1998 | Li et al. |
| 5,745,710 A | 4/1998 | Clanton, III et al. |
| 5,748,191 A | 5/1998 | Rozak et al. |
| 5,748,263 A | 5/1998 | Ball |
| 5,748,716 A | 5/1998 | Levine |
| 5,751,282 A | 5/1998 | Girard et al. |
| 5,752,160 A | 5/1998 | Dunn |
| 5,754,939 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,606 A | 6/1998 | Wolzien |
| 5,768,528 A | 6/1998 | Stumm |
| 5,774,357 A | 6/1998 | Hoffberg et al. |
| 5,774,664 A | 6/1998 | Hidary et al. |
| 5,778,181 A | 7/1998 | Hidary et al. |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,201 A | 8/1998 | Antos |
| 5,790,202 A | 8/1998 | Kummer et al. |
| 5,790,753 A | 8/1998 | Krishnamoorthy et al. |
| 5,793,964 A | 8/1998 | Rogers et al. |
| 5,793,972 A | 8/1998 | Shane |
| 5,798,785 A | 8/1998 | Hendricks et al. |
| 5,801,747 A | 9/1998 | Bedard |
| 5,805,763 A | 9/1998 | Lawler et al. |
| 5,805,806 A | 9/1998 | McArthur |
| 5,809,214 A | 9/1998 | Nureki et al. |
| 5,812,123 A | 9/1998 | Rowe et al. |
| 5,812,931 A | 9/1998 | Yuen |
| 5,815,671 A | 9/1998 | Morrison |
| 5,818,441 A | 10/1998 | Throckmorton et al. |
| 5,818,511 A | 10/1998 | Farry et al. |
| 5,818,935 A | 10/1998 | Maa |
| 5,819,156 A | 10/1998 | Belmont |
| 5,822,123 A | 10/1998 | Davis et al. |
| 5,828,420 A | 10/1998 | Marshall et al. |
| 5,828,839 A | 10/1998 | Moncreiff |
| 5,828,945 A | 10/1998 | Klosterman |
| 5,832,223 A | 11/1998 | Hara et al. |
| 5,833,468 A | 11/1998 | Guy et al. |
| 5,835,717 A | 11/1998 | Karlton et al. |
| 5,838,383 A | 11/1998 | Chimoto et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer et al. |
| 5,867,233 A | 2/1999 | Tanaka et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,880,768 A | 3/1999 | Lemmons et al. |
| 5,886,732 A | 3/1999 | Humpleman |
| 5,889,950 A | 3/1999 | Kuzma |
| 5,892,498 A | 4/1999 | Marshall et al. |
| 5,892,767 A | 4/1999 | Bell et al. |
| 5,903,545 A | 5/1999 | Sabourin et al. |
| 5,903,816 A | 5/1999 | Broadwin et al. |
| 5,907,322 A | 5/1999 | Kelly et al. |
| 5,907,323 A | 5/1999 | Lawler et al. |
| 5,914,712 A | 6/1999 | Sartain et al. |
| 5,914,746 A | 6/1999 | Matthews, III et al. |
| 5,923,848 A | 7/1999 | Goodhand et al. |
| 5,929,849 A | 7/1999 | Kikinis |
| 5,929,932 A | 7/1999 | Otsuki et al. |
| 5,931,905 A | 8/1999 | Hashimoto et al. |
| 5,937,160 A | 8/1999 | Davis et al. |
| 5,940,073 A | 8/1999 | Klosterman et al. |
| 5,945,987 A | 8/1999 | Dunn |
| 5,946,386 A | 8/1999 | Rogers et al. |
| 5,949,954 A | 9/1999 | Young et al. |
| 5,955,988 A | 9/1999 | Blonstein et al. |
| 5,973,683 A | 10/1999 | Cragun et al. |
| 5,977,964 A | 11/1999 | Williams et al. |
| 5,988,078 A | 11/1999 | Levine |
| 5,990,927 A | 11/1999 | Hendricks et al. |
| 5,991,799 A | 11/1999 | Yen et al. |
| 5,995,102 A * | 11/1999 | Rosen et al. ............. 715/856 |
| 6,002,394 A | 12/1999 | Schein et al. |
| 6,002,401 A | 12/1999 | Baker |
| 6,002,443 A | 12/1999 | Iggulden |
| 6,005,562 A | 12/1999 | Shiga et al. |
| 6,005,563 A | 12/1999 | White et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,020,883 A | 2/2000 | Herz et al. |
| 6,023,267 A | 2/2000 | Chapuis et al. |
| 6,025,837 A | 2/2000 | Matthews, III et al. |
| 6,029,195 A | 2/2000 | Herz |
| 6,034,677 A | 3/2000 | Noguchi et al. |
| 6,034,680 A | 3/2000 | Kessenich et al. |
| 6,058,238 A | 5/2000 | Ng |
| 6,067,561 A | 5/2000 | Dillon |
| 6,072,460 A | 6/2000 | Marshall et al. |
| 6,075,526 A | 6/2000 | Rothmuller |
| 6,081,750 A | 6/2000 | Hoffberg et al. |
| 6,088,722 A | 7/2000 | Herz et al. |
| 6,091,883 A | 7/2000 | Artigalas et al. |

(56) References Cited

U.S. PATENT DOCUMENTS

| | | |
|---|---|---|
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,125,230 A | 9/2000 | Yaginuma |
| 6,130,726 A | 10/2000 | Darbee et al. |
| 6,133,909 A | 10/2000 | Schein et al. |
| 6,139,177 A | 10/2000 | Venkatraman et al. |
| 6,151,643 A | 11/2000 | Cheng et al. |
| 6,157,411 A | 12/2000 | Williams et al. |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,335 B1 | 1/2001 | Hendricks et al. |
| 6,184,877 B1 | 2/2001 | Dodson et al. |
| 6,208,384 B1 | 3/2001 | Schultheiss |
| 6,212,553 B1 | 4/2001 | Lee et al. |
| 6,215,483 B1 | 4/2001 | Zigmond |
| 6,216,264 B1 | 4/2001 | Maze et al. |
| 6,233,734 B1 | 5/2001 | Macrae et al. |
| 6,237,022 B1 | 5/2001 | Bruck et al. |
| 6,237,049 B1 | 5/2001 | Ludtke |
| 6,240,555 B1 | 5/2001 | Shoff et al. |
| 6,262,722 B1 | 7/2001 | Allison et al. |
| 6,263,501 B1 | 7/2001 | Schein et al. |
| 6,268,849 B1 | 7/2001 | Boyer et al. |
| 6,268,856 B1 | 7/2001 | Bruck et al. |
| 6,275,268 B1 | 8/2001 | Ellis et al. |
| 6,282,713 B1 | 8/2001 | Kitsukawa et al. |
| 6,308,202 B1 | 10/2001 | Cohn et al. |
| 6,310,886 B1 | 10/2001 | Barton |
| 6,317,780 B1 | 11/2001 | Cohn et al. |
| 6,317,791 B1 | 11/2001 | Cohn et al. |
| 6,317,885 B1 | 11/2001 | Fries |
| 6,327,049 B1 | 12/2001 | Ohtsuka |
| 6,331,877 B1 | 12/2001 | Bennington et al. |
| 6,335,736 B1 | 1/2002 | Wagner et al. |
| 6,335,963 B1 | 1/2002 | Bosco |
| 6,341,374 B2 | 1/2002 | Schein et al. |
| 6,342,926 B1 | 1/2002 | Hanafee et al. |
| 6,357,043 B1 | 3/2002 | Ellis et al. |
| 6,359,636 B1 | 3/2002 | Schindler et al. |
| 6,373,528 B1 | 4/2002 | Bennington et al. |
| 6,388,714 B1 | 5/2002 | Schein et al. |
| 6,396,546 B1 | 5/2002 | Alten et al. |
| 6,400,407 B1 | 6/2002 | Zigmond et al. |
| 6,408,437 B1 | 6/2002 | Hendricks et al. |
| 6,411,696 B1 | 6/2002 | Iverson et al. |
| 6,437,836 B1 | 8/2002 | Huang et al. |
| 6,442,529 B1 | 8/2002 | Krishan et al. |
| 6,452,609 B1 | 9/2002 | Katinsky et al. |
| 6,463,585 B1 | 10/2002 | Hendricks et al. |
| 6,481,012 B1 | 11/2002 | Gordon et al. |
| 6,505,348 B1 | 1/2003 | Knowles et al. |
| 6,509,908 B1 | 1/2003 | Croy et al. |
| 6,510,555 B1 | 1/2003 | Tsurumoto |
| 6,516,467 B1 | 2/2003 | Schindler et al. |
| 6,518,986 B1 | 2/2003 | Mugura |
| 6,526,577 B1 | 2/2003 | Knudson et al. |
| 6,545,722 B1 | 4/2003 | Schultheiss et al. |
| 6,560,777 B2 | 5/2003 | Blackketter et al. |
| 6,574,424 B1 | 6/2003 | Dimitri et al. |
| 6,584,153 B1 | 6/2003 | Comito et al. |
| 6,588,014 B1 | 7/2003 | Hayashi |
| 6,600,503 B2 | 7/2003 | Stautner et al. |
| 6,604,240 B2 | 8/2003 | Ellis et al. |
| 6,606,103 B1 | 8/2003 | Hamlet et al. |
| 6,606,128 B2 | 8/2003 | Hanafee et al. |
| 6,611,654 B1 | 8/2003 | Shteyn |
| 6,637,032 B1 | 10/2003 | Feinleib |
| 6,661,468 B2 | 12/2003 | Alten et al. |
| 6,675,385 B1 | 1/2004 | Wang |
| 6,675,386 B1 | 1/2004 | Hendricks et al. |
| 6,678,891 B1 | 1/2004 | Wilcox et al. |
| 6,698,020 B1 | 2/2004 | Zigmond et al. |
| 6,732,369 B1 | 5/2004 | Schein et al. |
| 6,745,391 B1 | 6/2004 | Macrae et al. |
| 6,750,919 B1 | 6/2004 | Rosser |
| 6,754,904 B1 | 6/2004 | Cooper et al. |
| 6,754,905 B2 | 6/2004 | Gordon et al. |
| 6,760,537 B2 | 7/2004 | Mankovitz |
| 6,766,524 B1 | 7/2004 | Matheny et al. |
| 6,826,351 B1 | 11/2004 | Tsujisawa et al. |
| 6,828,993 B1 | 12/2004 | Hendricks et al. |
| 6,865,746 B1 | 3/2005 | Herrington et al. |
| 6,892,354 B1 | 5/2005 | Servan-Schreiber et al. |
| 6,898,762 B2 | 5/2005 | Ellis et al. |
| 6,925,567 B1 | 8/2005 | Hirata |
| 6,928,652 B1 | 8/2005 | Goldman |
| 6,934,963 B1 | 8/2005 | Reynolds et al. |
| 6,934,965 B2 | 8/2005 | Gordon et al. |
| 6,973,669 B2 | 12/2005 | Daniels |
| 7,000,242 B1 | 2/2006 | Haber |
| 7,003,478 B1 | 2/2006 | Choi |
| 7,010,801 B1 | 3/2006 | Jerding et al. |
| 7,017,173 B1 | 3/2006 | Armstrong et al. |
| 7,058,635 B1 | 6/2006 | Shah-Nazaroff et al. |
| 7,103,904 B1 | 9/2006 | Blackketter et al. |
| 7,117,440 B2 | 10/2006 | Gordon et al. |
| 7,143,428 B1 | 11/2006 | Bruck et al. |
| 7,159,232 B1 | 1/2007 | Blackketter et al. |
| 7,165,098 B1 | 1/2007 | Boyer et al. |
| 7,174,512 B2 | 2/2007 | Martin et al. |
| 7,185,355 B1 | 2/2007 | Ellis et al. |
| 7,187,847 B2 | 3/2007 | Young et al. |
| 7,194,698 B2 | 3/2007 | Gottfurcht et al. |
| 7,328,450 B2 | 2/2008 | Macrae et al. |
| 7,349,976 B1 | 3/2008 | Glaser et al. |
| 7,437,751 B2 | 10/2008 | Daniels |
| 7,480,929 B2 | 1/2009 | Klosterman et al. |
| 7,493,641 B2 | 2/2009 | Klosterman et al. |
| 7,631,329 B1 | 12/2009 | Yamada |
| 7,634,787 B1 | 12/2009 | Gebhardt et al. |
| 7,665,109 B2 | 2/2010 | Matthews, III et al. |
| 7,721,307 B2 | 5/2010 | Hendricks et al. |
| 7,757,254 B2 | 7/2010 | Shoff et al. |
| 2001/0010095 A1 | 7/2001 | Ellis et al. |
| 2001/0029610 A1 | 10/2001 | Corvin et al. |
| 2002/0010697 A1 | 1/2002 | Marshall et al. |
| 2002/0026496 A1 | 2/2002 | Boyer et al. |
| 2002/0032907 A1 | 3/2002 | Daniels |
| 2002/0042918 A1 | 4/2002 | Townsend et al. |
| 2002/0059599 A1 | 5/2002 | Schein et al. |
| 2002/0112249 A1 | 8/2002 | Hendricks et al. |
| 2002/0120927 A1 | 8/2002 | Harada et al. |
| 2002/0138840 A1 | 9/2002 | Schein et al. |
| 2003/0001965 A1 | 1/2003 | Cao et al. |
| 2003/0005445 A1 | 1/2003 | Schein et al. |
| 2003/0031465 A1 | 2/2003 | Blake |
| 2003/0052905 A1 | 3/2003 | Gordon et al. |
| 2003/0115600 A1 | 6/2003 | Tanaka |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0208758 A1 | 11/2003 | Schein et al. |
| 2004/0003407 A1 | 1/2004 | Hanafee et al. |
| 2004/0078815 A1 | 4/2004 | Lemmons et al. |
| 2004/0103439 A1 | 5/2004 | Macrae et al. |
| 2004/0139465 A1 | 7/2004 | Matthews et al. |
| 2004/0169685 A1 | 9/2004 | Kubala |
| 2004/0210935 A1 | 10/2004 | Schein et al. |
| 2004/0221310 A1 | 11/2004 | Herrington et al. |
| 2005/0015815 A1 | 1/2005 | Shoff et al. |
| 2005/0138660 A1 | 6/2005 | Boyer et al. |
| 2005/0198668 A1 | 9/2005 | Yuen et al. |
| 2005/0204388 A1 | 9/2005 | Knudson et al. |
| 2005/0229215 A1 | 10/2005 | Schein et al. |

(56) References Cited

U.S. PATENT DOCUMENTS

| | | |
|---|---|---|
| 2005/0235320 A1 | 10/2005 | Maze et al. |
| 2005/0267819 A1 | 12/2005 | Kaplan |
| 2005/0278741 A1 | 12/2005 | Robarts et al. |
| 2005/0278768 A1 | 12/2005 | Boyer et al. |
| 2006/0037044 A1 | 2/2006 | Daniels |
| 2007/0067805 A1 | 3/2007 | Macrae et al. |
| 2007/0271582 A1 | 11/2007 | Ellis et al. |
| 2008/0059571 A1 | 3/2008 | Khoo |
| 2008/0178221 A1 | 7/2008 | Schein et al. |
| 2008/0184308 A1 | 7/2008 | Herrington et al. |
| 2008/0184312 A1 | 7/2008 | Schein et al. |
| 2008/0201740 A1 | 8/2008 | Boyer et al. |
| 2008/0235725 A1 | 9/2008 | Hendricks |
| 2008/0276283 A1 | 11/2008 | Boyer et al. |
| 2008/0288980 A1 | 11/2008 | Schein et al. |
| 2009/0006189 A1 | 1/2009 | Zhang et al. |
| 2009/0070817 A1 | 3/2009 | Ellis et al. |
| 2010/0115413 A1 | 5/2010 | Schein et al. |
| 2010/0115541 A1 | 5/2010 | Schein et al. |
| 2010/0211969 A1 | 8/2010 | Schein et al. |
| 2010/0211975 A1 | 8/2010 | Boyer et al. |
| 2011/0173660 A1 | 7/2011 | Schein et al. |

FOREIGN PATENT DOCUMENTS

| | | |
|---|---|---|
| DE | 36 40 436 | 6/1988 |
| DE | 42 01 031 | 7/1993 |
| DE | 42 17 246 | 12/1993 |
| DE | 42 40 187 | 6/1994 |
| DE | 44 07 701 | 9/1995 |
| DE | 44 40 419 | 5/1996 |
| DE | 195 31 121 | 2/1997 |
| DE | 197 40 079 | 3/1999 |
| EP | 0 276 425 | 8/1988 |
| EP | 0 617 563 | 9/1994 |
| EP | 0 624 040 A2 | 11/1994 |
| EP | 0 705 036 | 4/1996 |
| EP | 0 721 253 | 7/1996 |
| EP | 0 723 369 | 7/1996 |
| EP | 0 725 539 | 8/1996 |
| EP | 0 742 669 | 11/1996 |
| EP | 0 774 853 | 5/1997 |
| EP | 0 774 866 | 5/1997 |
| EP | 0 793 225 | 9/1997 |
| EP | 0 805 594 | 11/1997 |
| EP | 0 837 599 | 4/1998 |
| EP | 0 852 361 | 7/1998 |
| EP | 0 854 645 | 7/1998 |
| EP | 0 945 003 | 9/1999 |
| GB | 1 554 411 | 10/1979 |
| GB | 2232031 A | 11/1990 |
| GB | 2264409 A | 8/1993 |
| GB | 2265792 A | 10/1993 |
| JP | 60-61935 A | 4/1985 |
| JP | 06392177 | 4/1988 |
| JP | 03-022770 | 1/1991 |
| JP | 04079053 | 3/1992 |
| JP | 04227380 A | 8/1992 |
| JP | 4-335395 A | 11/1992 |
| JP | 05260400 A | 10/1993 |
| JP | 06021907 A | 1/1994 |
| JP | 06038165 | 2/1994 |
| JP | 06504165 T | 5/1994 |
| JP | 06243539 | 9/1994 |
| JP | 0721619 | 1/1995 |
| JP | 07-135621 A | 5/1995 |
| JP | 07123326 A | 5/1995 |
| JP | 07147657 A | 6/1995 |
| JP | 07154349 A | 6/1995 |
| JP | 07160732 | 6/1995 |
| JP | 07184131 A | 7/1995 |
| JP | 07193762 A | 7/1995 |
| JP | 07193763 A | 7/1995 |
| JP | 0720254 | 11/1995 |
| JP | 08-056352 | 2/1996 |
| JP | 0832528 | 2/1996 |
| JP | 08032538 A | 2/1996 |
| JP | 08125497 A | 5/1996 |
| JP | 08506941 | 7/1996 |
| JP | 08251122 A | 9/1996 |
| JP | 08275077 A | 10/1996 |
| JP | 09-102827 | 4/1997 |
| WO | WO-86/01359 A1 | 2/1986 |
| WO | WO-87/03766 | 6/1987 |
| WO | WO-88/04507 | 6/1988 |
| WO | WO-89/03085 | 4/1989 |
| WO | WO-91/05436 A1 | 4/1991 |
| WO | WO 94/14282 | 6/1994 |
| WO | WO-94/14284 | 6/1994 |
| WO | WO-9413107 A1 | 6/1994 |
| WO | WO-95/01056 | 1/1995 |
| WO | WO-95/01057 | 1/1995 |
| WO | WO-95/01058 A1 | 1/1995 |
| WO | WO-95/01059 | 1/1995 |
| WO | WO-95/04431 A2 | 2/1995 |
| WO | WO-95/10910 | 4/1995 |
| WO | WO-9515657 A1 | 6/1995 |
| WO | WO-9515658 A1 | 6/1995 |
| WO | WO-9519092 A1 | 7/1995 |
| WO | WO-95/28055 | 10/1995 |
| WO | WO-95/28799 A1 | 10/1995 |
| WO | WO-9526608 A1 | 10/1995 |
| WO | WO-95/32583 A1 | 11/1995 |
| WO | WO-95/32585 | 11/1995 |
| WO | WO-95/32587 | 11/1995 |
| WO | WO-96/07270 | 3/1996 |
| WO | WO-96/09721 | 3/1996 |
| WO | WO-96/13932 | 5/1996 |
| WO | WO-9613013 A1 | 5/1996 |
| WO | WO-9617467 A2 | 6/1996 |
| WO | WO-9617473 A1 | 6/1996 |
| WO | WO-96/20555 | 7/1996 |
| WO | WO-96/21990 A2 | 7/1996 |
| WO | WO-9627989 | 9/1996 |
| WO | WO-96/34491 | 10/1996 |
| WO | WO-9631980 A1 | 10/1996 |
| WO | WO-9634486 A1 | 10/1996 |
| WO | WO-96/37996 | 11/1996 |
| WO | WO-96/41478 | 12/1996 |
| WO | WO-9638962 | 12/1996 |
| WO | WO-9641471 A1 | 12/1996 |
| WO | WO-97/13368 | 4/1997 |
| WO | WO-97/19555 A1 | 5/1997 |
| WO | WO-97/29458 A1 | 8/1997 |
| WO | WO-97/31480 | 8/1997 |
| WO | WO-97/36422 | 10/1997 |
| WO | WO-97/42763 | 11/1997 |
| WO | WO-97/46943 A1 | 12/1997 |
| WO | WO-97/47106 | 12/1997 |
| WO | WO-97/47143 | 12/1997 |
| WO | WO-97/48230 | 12/1997 |
| WO | WO-97/49237 | 12/1997 |
| WO | WO-97/49242 | 12/1997 |
| WO | WO-97/50251 | 12/1997 |
| WO | WO-9745786 | 12/1997 |
| WO | WO-98/00975 A1 | 1/1998 |
| WO | WO-98/00976 | 1/1998 |
| WO | WO-98/06219 | 2/1998 |
| WO | WO-98/10589 | 3/1998 |
| WO | WO-98/17064 A1 | 4/1998 |
| WO | WO-9817063 A1 | 4/1998 |
| WO | WO 9821664 | 5/1998 |
| WO | WO-9821877 | 5/1998 |
| WO | WO-98/26584 | 6/1998 |
| WO | WO-98/39893 A2 | 9/1998 |
| WO | WO-98/41013 A1 | 9/1998 |
| WO | WO-98/41020 A1 | 9/1998 |
| WO | WO-98/43183 | 10/1998 |
| WO | WO-9848566 A2 | 10/1998 |
| WO | WO-98/53611 A1 | 11/1998 |
| WO | WO-98/56173 | 12/1998 |
| WO | WO-98/56176 A1 | 12/1998 |
| WO | WO-99/03267 | 1/1999 |

(56) References Cited

FOREIGN PATENT DOCUMENTS

| WO | WO-99/04561 A1 | 1/1999 |
|---|---|---|
| WO | WO-99/04570 | 1/1999 |
| WO | WO-9901984 A1 | 1/1999 |
| WO | WO-99/14947 | 3/1999 |
| WO | WO-99/22523 A1 | 5/1999 |
| WO | WO-99/30491 | 6/1999 |
| WO | WO-99/45700 | 9/1999 |
| WO | WO-9945701-AI | 9/1999 |
| WO | WO-99/60783 | 11/1999 |
| WO | WO-0004708 A1 | 1/2000 |
| WO | WO-0005889 A1 | 2/2000 |
| WO | WO-0028734 A1 | 5/2000 |
| WO | WO-0079798 | 12/2000 |
| WO | WO-98/16062 | 6/2007 |

OTHER PUBLICATIONS

"Dial M for Movie," Funkschau Nov. 1994, Perspektiven, Video on Demand, pp. 78-79. (English language translation attached.).
"Dialing the printed page," ITT in Europe Profile, 11/Spring 1977.
"Digital Video Broadcasting (DVB); DVB specification for data broadcasting", European Telecommunications Standards Institute, Draft EN 301 192 V1.2.1 (Jan. 1999).
"Electronic Program Guide via Internet," Research Disclosure, Kenneth Mason Publications, Hampshire, GB Nr. 385 (May 1996) p. 276, ISSN:0374-4353.
"Growing US interest in the impact of viewdata," Computing Weekly, Jul. 20, 1978.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"Open TV fur interaktives Fernsehen," Trend & Technik, 9-95 RFE, p. 100. (English language translation attached.).
"OpenTV Launches OpenStreamer™ Technology for Broadcasters to Deliver First-Ever Real-Time Digital Interactive Television", from the Internet at http://www.opentv.com/news/openstreamer_press_final.htm, printed on Jun. 28, 1999, the document bears a copyright date of 1999.
"OpenTV(R) and Interactive Channel Form Strategic Alliance to Deliver Interactive Programming to Satellite Television Subscribers", from the Internet at http://www.opentv.com/news/interactivechannelfinal.htm, printed on Jun. 28, 1999.
"Prevue Networks and OpenTV(R) Agree to Work Together on Deploying Interactive Program Guides Worldwide", from the Internet at http://www.opentv.com/news/prevuefinal.htm, printed on Jun. 28, 1999.
"Prodigy Launches Interactive TV Listing," Apr. 22, 1994, Public Broadcasting Report.
"Reaching your subscribers is a complex and costly process—until now," from the Internet at http://www.evolveproducts.com/info.html, printed on Dec. 28, 1998.
"Rewind, replay and unwind with new high-tech TV devices," by Lawrence J. Magi d, LA Times. This document was printed from the Internet on Jun. 6, 1999 and bears a date of May 19, 1999.
"StarBurst Omni Cast Server-to-Server", StarBurst Software from the Internet at http://www.starburstsoftware.com/OmniCast-server-to-server.pdf, printed Apr. 9, 1999.
"StarBurst Omnicast Provides First Software-based Content Distribution Solution for One-Way Satellite Networks", StarBurst Software Press Release, from the Internet at http://www.starburstcom.com/pr_fec.htm, bearing a date of Feb. 1, 1999, printed Apr. 9, 1999.
"StarBurst OmniCast Server-to-Desktop", from the Internet at http://www.starburstsoftware.com/OmniCast-server-to-desktop.pdf, printed Apr. 9, 1999.
"Sun's Next Steps in Digital Set-Tops," article in Cablevision, p. 56, Nov. 16, 1998.
"Teletext presents the alternative view," Financial Times, Oct. 24, 1977.

"The Evolve EZ Guide. The Remote Control," from the Internet at http://www.evolveproducts.com/display2.html, printed on Dec. 28, 1998.
The MyCalendar website. This website is located at www.mycalendar.com bearing copyright dates of 1997-1999 (as printed from the Internet Oct. 26-27, 1999).
"Three men on a Viewdata bike," The Economist, Mar. 25, 1978.
"TV Guide Online Set for Fall," Entertainment Marketing Letter, Aug. 1994.
"UVSG Offers System-Specific Web Site Development for OPS," press release of United Video Satellite Group, Apr. 12, 1996.
"UVSG Teams With Microsoft on Internet Information Server," press release of United Video Satellite Group, Feb. 22, 1996.
"Viewdata and its potential impact in the USA: Final Report/Volume One, The UK Experience," Link and Butler Cox & Partners Limited, Oct. 1978.
"Viewdata moves in US but GEC may lose out," Computing Weekly, Jan. 25, 1978.
"Viewdata Service Terminal Specification," British Post Office, Issue 5, Aug. 1978.
"Web TV and Its Consumer Electronics Licensees Debut First Internet Television Network and Set-Top Box," Jul. 10, 1996 <http://www.ohlfs.com/keith/self/webtv/home/HTML/home.license.html>.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
"Windows 98 Feature Combines TV, Terminal and the Internet," New York Times, Aug. 18, 1998.
ACM Multimedia 93 Proceedings, "A Digital On-Demand Video Service Supporting Content-Based Queries," Little et al. pp. 427-436, Jul. 1993.
Armstrong, L., "Channel-Surfing's next wave: Henry Yuen's interactive TV guide takes on TCI and Viacom," BusinessWeek, Jul. 31, 1995.
Arnold, W.F., "Britain to get wired city—via telephone," Electronics, Mar. 4, 1976, at 76.
Blahut et al., "Interactive Television," Proceedings of the IEEE, Jul. 1995.
Boyd-Merritt, R., "Television wires two-way video," Electronic Engineering Times, Apr. 25, 1994.
Brugliera, "Digital On-Screen Display—A New Technology for the Consumer Interface," *Symposium Record Cable Sessions*, 18th International Television Symposium and Technical Exhibition, Montreux, Switzerland Jun. 10-15, 1993, pp. 572-586 (Jun. 11, 1993).
CableData brochure "A New Approach to Addressability" (undated).
Office Actions and Replies filed in U.S. Appl. No. 11/894,724 (Our Ref. GS-22 Cont. 4).
Day, R., "The Great PC/TV Debate," OEM Magazine, Jul. 1, 1996.
DIRECTV Plus2 System, Thompson Consumer Electronics, Inc. (1999).
DiRosa, S., "BIGSURF Netguide," Jul. 1995, vol. 3.1 (Sections 18, 21, and 28—renumbered as pp. 1-27).
Eitz, Gerhard, "Zukünftige Informations—Und Datenangebote Beim Digitalen Fernsehen—EPG Und "Lesezeichen"," Rundfunktechnische Mitteilungen, vol. 41, pp. 67-72, Jun. 1997.
European Telecommunication Standard, "Electronic Programme Guide (EPG); Protocol for a TV Guide using electronic data transmission", pp. 1-45, sections 1-11.12.7 and annex A-P, bearing a date of May 1997.
Fernsehen—EPG Und "Lesezeichen", Rundfunktechnische Mitteilungen, vol. 41, pp. 67-72, Jun. 1997.
Hartwig et al., "Broadcasting and Processing of Program Guides for Digital TV", SMPTE Journal, pp. 727-732, Oct. 1997.
Hobbes Internet Timeline, Mar. 22, 2007.
Hofmann et al., "Videotext Programmiert Videorecorder," Rundfunktechnische Mitteilungen, Nov.-Dec. 1982, pp. 254-257 (translation attached).
Holland, G. L., "NAPLPS standard defines graphics and text communications," EDN, Jan. 10, 1985, at 179.

(56) References Cited

OTHER PUBLICATIONS

Iizuka et al., Building Internet TV Guide Service 1 and 2, the 53rd National Conference Proceedings, Japan, Information Processing Society of Japan, Sep. 6, 1996 p. 3-227 to 230. (English).
Instruction Manual Using StarSight 2, StarSight Telecast, Inc., 1994.
Kai et al., "Development of a Simulation System for Integrated Services Television," Report from Information Processing Society of Japan, Japan, Sep. 13, 1996, vol. 96, No. 90 p. 13-20.
Keith Lynch's timeline of net related terms and concepts,Mar. 22, 2007.
Large, P., "Throw away the books—Viewdata's coming," Guardian, Jan. 10, 1978.
Large, P., "Viewdata, the invention that brings boundless advice and information to the home, also sets a test for the Post Office," Financial Guardian, Jun. 29, 1978.
Leftwich et al., *StarSight Interactive Television Program Guide, Phase III*, Functional/Interactional Architecture Specification Document, Orbit Interaction, Palo Alto, California.
Leftwich et al., *StarSight Interactive Television Program Guide, Phase IV*, Functional/Interactional Architecture Specification Document, Orbit Interaction, Palo Alto, California, published before Apr. 19, 1995.
Lists> What's on Tonite TV Listings Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*.
Lloyd, J., "Impact of technology," Financial Times, Jul. 1978.
Miller, M.D., "A Scenario for the Deployment of Interactive Multimedia Cable Television Systems in the United States in the 1990s," IEEE, 1994.
Money, S.A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at 57.
Neumann, Andreas, "WDR Online Aufbau Und Perspektiven Automatisierter Online-Dienste Im WDR," Rundfunktechnische Mitteilungen, vol. 41, pp. 56-66, Jun. 1997.
Owen, K., "How dial-a-fact is coming closer to home," The Times, Sep. 30, 1977.
Owen, K., "Why the Post Office is so excited by its plans for a TV screen information service," The Times, Sep. 26, 1976.
Periodical Funkschau, vol. Nov. 1994, pp. 78-79: Dial M for Movie.
Poole, J., "Demand for Viewdata grows," Sunday Times, Feb. 10, 1977.
Printout from Google News Archives, Mar. 22, 2007.
Qayyum, H., "Using IVDS and VBI for Interactive Television," IEEE, Jun. 10, 1996.
Rajapakshe et al., "Video on demand," (last modified Jun. 1995) <http://www-dse.doc.ic.ac.uk/~nd/suprise_95 /Journal/vol4/shr/report.html>.
Rath et al., "Set-Top Box Control Software: A Key Component in Digital Video," Philips Journal of Research, vol. 50, No. ½, 1996, at 185.
Rogers, C., "Telcos vs. Cable TV: The Global View," Data Communications, vol. 13, pp. 75-80 (Sep. 21, 1995).
Rosch, G. D., "New data and information system set for commercial market trial," Telephony, Mar. 20, 1978, at 96.
Ruffler et al., "InfoRadio on Demand, WebTV and digiTaz—Telecommerce Case Studies," May 23, 1996.
Ryan, M., "Interactive TV Takes a Corporate Twist," Electronic Engineering Times, Jul. 10, 1995.
Schauer, Tom: Internet Article, [Online] Sep. 28, 1995, XP002378870, Retrieved from the Internet: URL: www.vision2020.moscow.com/Archives/1995/9509/0058.htlm> [retrieved on Apr. 28, 2006] *the whole document*.
Schmuckler, Eric, "A marriage that's made in cyberspace (television networks pursue links with online information services)," May 16, 1994, Mediaweek, v4, n20, p. 22 (3).
Selected pages from the "BBC Online—Schedules" web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the PRESTEL show," New Scientist, Jun. 1, 1978, at 586.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Stickland, D.C., "Its a common noun," The Economist, Jun. 5, 1978.
Stokes, A., "The viewdata age: Power to the People," Computing Weekly, Jan. 1979.
Technical White Paper, "OpenTV™ Operating Environment", ( © 1998 OpenTV Inc.), pp. 1-12.
The clickTV television program guide website of TVData of Queensbury, New York. This website is located at www.clicktv.com (as printed from the Internet on Aug. 13, 1997).
The InfoBeat television program guide website of InfoBeat, Inc. This website is located at www.infobeat.com (as printed from the Internet on Dec. 8, 1997).
The MyYahoo website. This website is located at edityahoo.com (as printed from the Internet Oct. 26-27, 1999).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
VideoGuide, Videoguide User's Manual, pp. 1-27.
Waldo, Jim, "JiniTM Architecture Overview," from the Internet at http://Java.sun.com/products/jini/whitepapers/architectureoverview.pdf/ printed on Jan. 25, 1999. The document bears a copyright date of 1998.
Whitehorn, K., "Viewdata and you," Observer, Jul. 30, 1978.
Wikipedia article on CompuServe, Mar. 22, 2007.
Wittig, H. et al., Intelligent Media Agents in Interactive Television Systems Proceedings of the International Conference on Multimedia Computing and Systems, Los Alamitos, CA, US, May 15, 1995,—May 18, 1995, pp. 182-189, XP00603484 p. 183, left hand column, paragraph 2, p. 184, right-hand column, paragraph 2 figure 4.
Yoshida, J., "Interactive TV a Blur," Electronic Engineering Times, Jan. 30, 1995.
DAVIC 1.3.1 Specification Part 1, Description of Digital Audio-Visual Functionalities (Technical Report), Published by Digital Audio-Visual Council, Geneva, Switzerland (1998).

\* cited by examiner

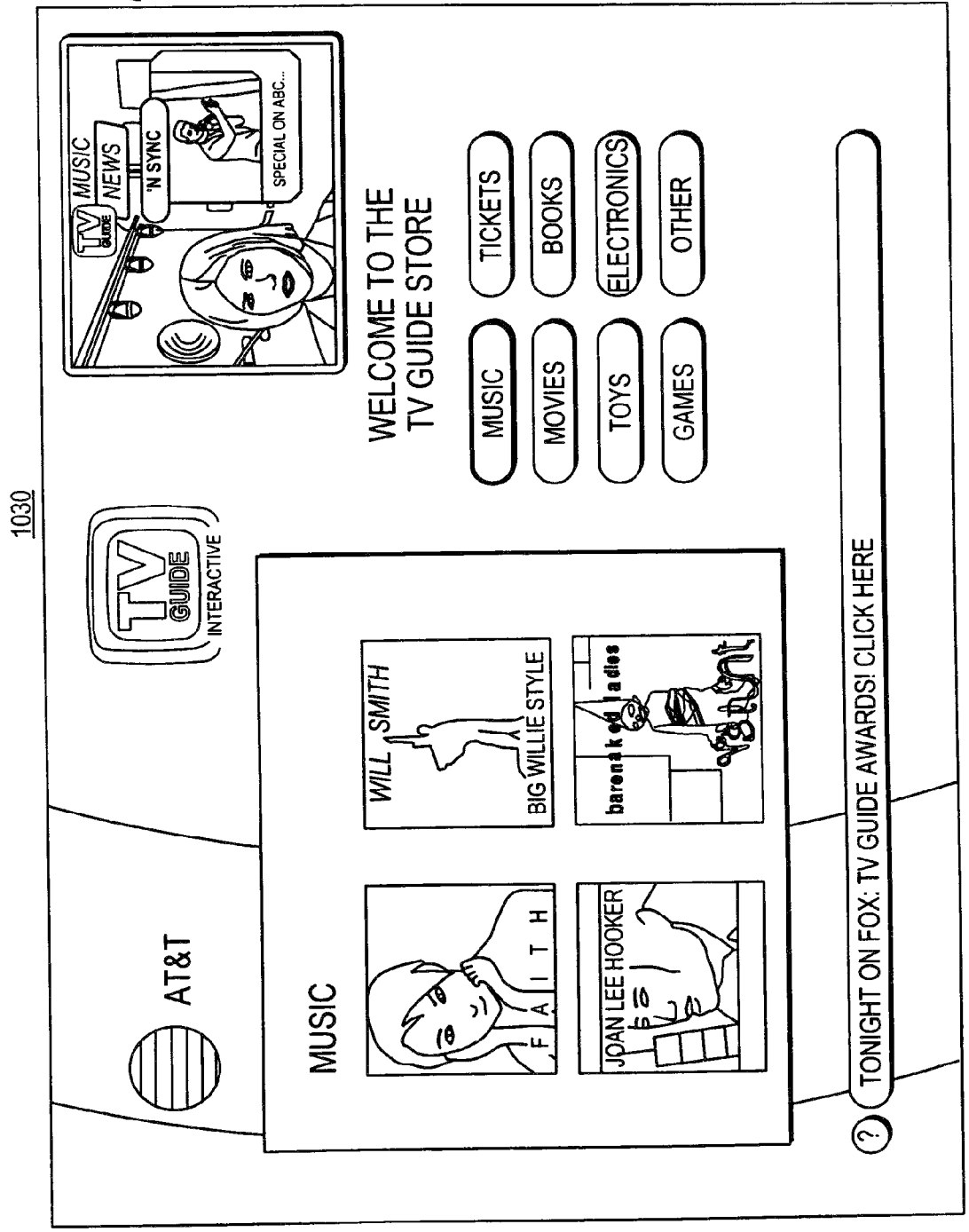

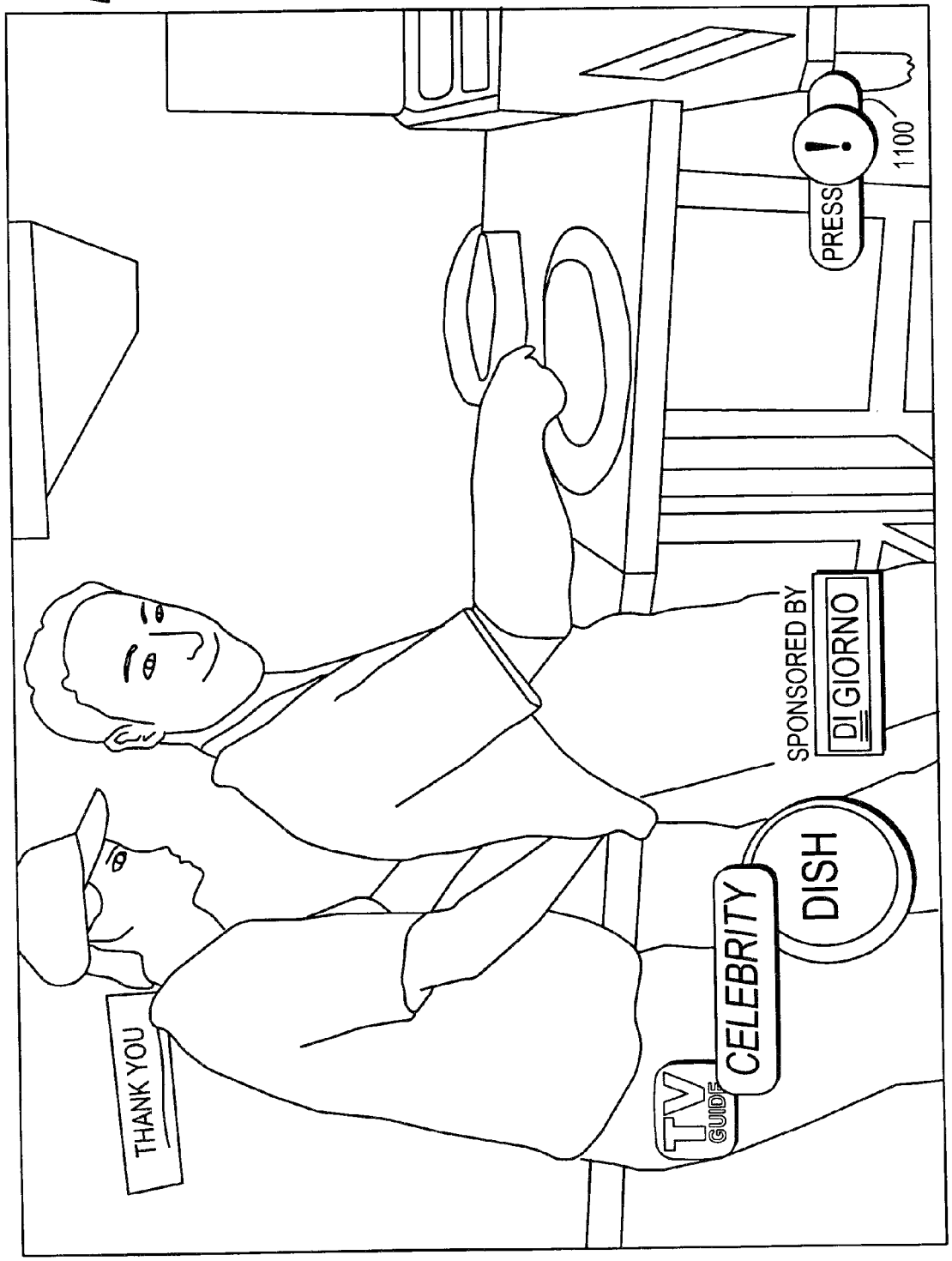

SYSTEMS AND METHODS FOR COORDINATING INTERACTIVE AND PASSIVE ADVERTISEMENT AND MERCHANDISING OPPORTUNITIES

CROSS-REFERENCE TO RELATED APPLICATIONS

This application is a continuation of U.S. patent application Ser. No. 12/775,974, filed May 7, 2010, which is a continuation of U.S. patent application Ser. No. 09/731,115, filed Dec. 6, 2000 (now abandoned), which claims the benefit of U.S. provisional patent application No. 60/170,060, filed Dec. 10, 1999, each of which is incorporated herein by reference in its entirety.

BACKGROUND OF THE INVENTION

This invention relates to passive and interactive advertising and merchandising systems and methods and, more particularly, television products for performing the same.

Cable, satellite, and broadcast television systems provide viewers with a large number of television channels. Viewers have traditionally consulted printed television program schedules to determine the programs being broadcast at a particular time. More recently, passive and interactive electronic television program guides have been developed that allow television program information to be displayed on a viewer's television. Promotional channels such as barker channels have also been developed that advertise various premium channel and pay-per-view promotions.

Passive electronic television program guides typically provide a scrolling or paging list of program listings on a dedicated television channel. The TV Guide Channel is a passive program guide in which viewers are presented with promotional videos or trailers in one portion of the screen and program listings in another.

Interactive television program guides are typically implemented on set-top boxes and allow users to navigate through television program listings using a remote control. In a typical program guide, various groups of television program listings are displayed in predefined or user-selected categories. Program listings are typically displayed in a grid or table. Some interactive guides are client-server based and some others are on-line. In client-server based guides, program guide data is typically provided to the set-top in response to requests from the guide that are processed by a server at a cable system head-end. In on-line guides, users may access a web site with their Personal computer or Internet enabled set-top box to obtain program listings and other program related information.

Another type of program guide is the hybrid passive/interactive television program guide. A hybrid guide may be based on a passive guide channel containing a listings portion over which an interactive guide portion has been overlaid.

As suggested above, barker channels are typically promotional channels that display full screen promotions of pay-per-view programs. A barker channel may overlay price, ordering, event code, and time information over such promotions and even instruct the user on how to order the promoted pay-per-view program.

Such systems have been limited in their abilities to integrate sponsorship, advertising, and merchandising opportunities among passive video products such as barker channels, passive guides, and interactive guides.

It is therefore an object of the present invention to provide enhanced advertising and merchandising opportunities within passive and interactive programming and applications such as, for example, program guides.

SUMMARY OF THE INVENTION

This and other objects of the present invention are accomplished in accordance with the principles of the present invention by providing systems and methods in which passive programming, such as, for example, television programming, pay-per-view programming, commercials, one or more passive video products (e.g., barker channels, passive program guides, or other video products), or any other suitable passive program, and an interactive television program guide, or other interactive software, are provided. The interactive guide, or other interactive software (e.g., a web browser, operating system software, home shopping application, or any other suitable type of software any of which may sometimes be referred to herein as "interactive applications"), may integrate interactive program sponsorship, advertising, merchandising opportunities, or any suitable combination thereof, with the video content of the passive programming. Some features of such a system are described, for example, in Reichardt et al. U.S. provisional patent application Ser. No. 60/170,060, filed Dec. 10, 1999, which is hereby incorporated by reference herein in its entirety.

In accordance with the present invention, a main facility (e.g., a satellite uplink facility) may provide data from a data source to any number of distribution facilities (e.g., cable system headends, broadcast distribution facilities, a satellite distribution facilities, or any other suitable distribution facilities). There may be multiple data sources, some of which may be located at different facilities, which provide data to the main facility for localization and distribution. The data transmitted by the main facility to the distribution facilities may include data suitable for the interactive application. For example, the data may include television programming data (e.g., titles, channels, content information, rating information, advertising information, or any other information associated with television programming), and may also include other data for additional services other than television program listings (e.g., weather information, associated Internet web links, computer software, video clips, non-television advertisements etc.). Any suitable combination of programming data and other data may sometimes be referred to herein as "program guide data."

The main facility may also provide one or more videos for passive video products to the distribution facilities. The videos may be transmitted in real-time by the main facility to the distribution facilities for real-time distribution to user television equipment of any number of viewers. Alternatively, the main facility may transmit videos to the distribution facilities where the videos may be stored. The distribution facilities may later distribute the videos to the user television equipment of any number of viewers in real-time. This approach may be referred to as a "store-and-forward" video distribution scheme. If desired, a combination of the two approaches may be used. In still another suitable store-and-forward approach, passive guide videos may be provided on storage media (e.g., laser disks, digital versatile discs (DVDs), etc.), that are provided to the distribution facilities via the mail.

The distribution facilities may generate and distribute passive video product display screens, such as passive electronic program guide display screens or barker channel display screens, over dedicated television channels. Passive guide channel display screens may contain, for example, television programming data (e.g., program listings), other data, videos, or any suitable combination thereof.

The distribution facilities may distribute the program guide data for use by an interactive program guide. The interactive program guide may run wholly on a user's television equipment or partially on the television equipment and partially on a program guide server.

Program sponsorship and interactive advertising between one or more passive video products, or other television programming, may be integrated with interactive advertising within an interactive application such as, for example, interactive television program guide or any other interactive software (e.g., a web browser, operating system software, or any other suitable type of software). The interactive application may include, for example, one or more graphic advertisements. The graphic advertisements may promote any suitable product or service, including, but not limited to, passive programming. When a promotion is aired on the passive video product or other type of television channel, the system may display an interactive advertisement indicating the promotion and, if applicable, its sponsor. In response to a viewer selecting the interactive advertisement, the system may tune the viewer's equipment to the passive video product or other channel.

In another aspect of the invention, passive video products or other television programming may be branded (i.e., have an ad inserted from a source of products or services). In response to a viewer indicating a desire to access interactive content, the system may provide the interactive content with an advertisement for the advertiser associated with the brand.

The interactive application may be programmed to display a linked interactive advertisement using any suitable synchronization approach. For example, in a timing-based synchronization approach, program guide data may include a schedule (i.e., a timing synch) that indicates to the interactive guide scheduled times for linked interactive advertisements. In another communications-based synchronization approach, a passive video product may include, for example, a flag in its header (e.g., in its vertical blanking interval (VBI)) that alerts the interactive guide (or other hardware or software running in the user's equipment) to find and retrieve interactive content for a particular advertiser. If desired, this communications-based synchronization approach may be combined with the aforementioned timing-based synchronization approach. For example, interactive graphics may be downloaded to the interactive guide at the same time (or substantially the same time) as the promotions are provided to distribution facilities. These and other approaches may facilitate collection of advertisement revenues for time blocks across multiple platforms. For example, time blocks may be sold for time on two products—a passive video product and an interactive program guide. As another example, time blocks may be sold for time on a regular television channel and an interactive program guide.

Conventional television programming or passive video product promotions may be combined with interactive impulse-purchase features. The purchasing features may be provided by an interactive guide, or may be provided by non-program guide software. For example, a passive video product segment, promotion, or conventional television program may promote or otherwise include information about particular products or services. When interactive content is available for a product or service, an alert icon may be overlaid onto a video signal associated with the segment, promotion, or program to alert a user that interactive content is available.

When a user selects such an icon, a point-of-purchase window may be displayed in which purchase information for the product or service may be displayed. When a user completes a purchase, a full-screen display of the passive video product or conventional program may be redisplayed. Alternatively, a user may be provided with an opportunity to order other merchandise from, for example, a TV Guide Store.

Advertiser sponsorship may also be combined with interactive impulse-purchase fulfillment. When a conventional television or passive video product feature or segment is sponsored by a sponsor, an icon may be overlaid on a viewed screen that alerts the user to additional information concerning, for example, the subject of the feature or segment. In response to a user selecting the icon, interactive content, such as, for example, a point-of-purchase window, may be displayed. The products or services offered in the point-of-purchase window may be from the sponsor of the segment or feature, from a featured source, or from any other source.

Further features of the invention, its nature and various advantages will be more apparent from the accompanying drawings and the following detailed description of the preferred embodiments.

BRIEF DESCRIPTION OF THE DRAWINGS

FIGS. 10a-10f show illustrative display screens for combining conventional television programming with interactive impulse-purchase features in accordance with one embodiment of the present invention.

FIGS. 11a-11c show illustrative display screens for combining advertiser sponsorship with interactive impulse-purchase fulfillment in accordance with one embodiment of the present invention.

DETAILED DESCRIPTION OF THE PREFERRED EMBODIMENTS

Figure 1:
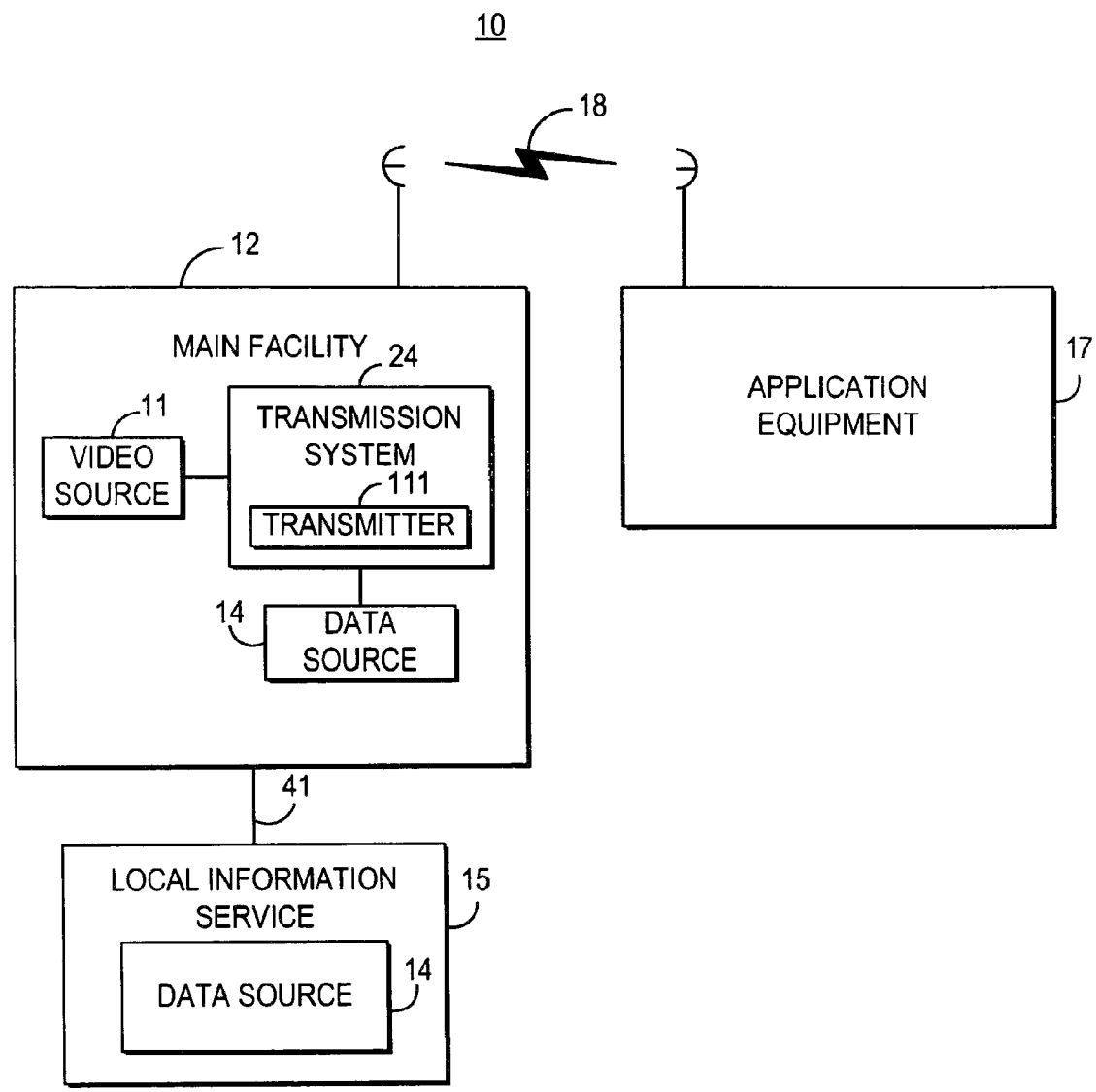
FIG. 1 is a schematic block diagram of an illustrative system in accordance with one embodiment of the present invention.

An illustrative system 10 in accordance with one embodiment of the present invention is shown in FIG. 1. For purposes of clarity, and not by way of limitation, system 10 is described herein as providing an interactive television program guide. In practice, and as described herein, system 10 may be any suitable system for providing passive programming and interactive applications. For example, data sources 14 may provide data for, for example, home shopping applications, operating system software, or any other application.

As shown in FIG. 1, main facility 12 may provide program guide or other application data from data source 14 within main facility 12 to application equipment 17 via communications link 18. There may be multiple data sources 14 but only one has been shown to avoid over complicating FIG. 1. If desired, program guide data sources 14 may also be located at facilities separate from main facility 12, such as at local information services 15, and may provide data to main facility 12 for localization and distribution. Data sources 14 may be any suitable computer or computer based system for obtaining data (e.g., manually from an operator, electronically via a computer network or other connection, or via storage media) and for putting the data into electronic form for distribution by main facility 12. Link 18 may be a satellite link, a telephone network link, a cable or fiber optic link, a microwave link, an Internet link, a combination of such links, or any other suitable communications link. If desired, one or more data sources 14 may provide data for both a passive and an interactive guide. Alternatively, data may be provided by one or more separate data sources 14 for each guide.

Local information service 15 may be any suitable facility for obtaining data particular to a localized region and for providing the data to main facility 12 over communications link 41. Local information service 15 may be, for example, a local weather station that measures weather data, a local newspaper that obtains local high school and college sporting information, or any other suitable provider of information. Local information service 15 may be a local business with a computer for providing main facility 12 with, for example, local ski reports, fishing conditions, menus, etc., or any other suitable provider of information. Link 41 may be a satellite link, a telephone network link, a cable or fiber optic link, a microwave link, an Internet link, a combination of such links, or any other suitable communications link.

The program guide data transmitted by main facility 12 to application equipment 17 may include television programming data (e.g., program identifiers, times, channels, titles, and descriptions) and other data for services other than television program listings (e.g., help text, pay-per-view information, weather information, sports information, music channel information, associated Internet web links, associated software, etc.). There are preferably numerous pieces or installations of application equipment 17, although only one is shown in FIG. 1 to avoid over-complicating FIG. 1.

Program guide data may be transmitted by main facility 12 to application equipment 17 using any suitable approach. Data files may, for example, be encapsulated as objects and transmitted using a suitable Internet based addressing scheme and protocol stack (e.g., a stack which uses the user datagram protocol (UDP) and Internet protocol (IP)). Systems in which program guide data is transmitted from a main facility using such protocols are described, for example, in Gollahon et al. U.S. patent application Ser. No. 09/332,624, filed Jun. 11, 1999, which is hereby incorporated by reference herein in its entirety.

Main facility 12 may also provide videos for passive video products to application equipment 17. Videos for the passive video products may be transmitted in real-time by main facility 12 to application equipment 17 for real-time distribution to the user television equipment of any number of users. Alternatively, main facility 12 may transmit or otherwise provide (e.g., on portable storage media) videos to application equipment 17 for storage. Portions of application equipment 17 may later distribute the videos to user television equipment of any number of users in real-time. This approach may be referred to as a "store-and-forward" video distribution scheme. If desired, a combination of the two approaches may be used. Systems in which videos are both distributed directly in real-time and stored-and-forwarded in real-time are described, for example, in Kern et al. U.S. patent application Ser. No. 09/332,448, filed Jun. 11, 1999, which is hereby incorporated by reference herein in its entirety. The application of such an approach in a hybrid guide system is described, for example, in Knudson et al. U.S. patent application Ser. No. 09/357,941, filed Jul. 16, 1999, which is hereby incorporated by reference herein in its entirety.

Main facility 12 may distribute videos in real-time or for store-and-forwarding by portions of application equipment 17 using any suitable approach. As described, for example, in above-mentioned Kern et al. U.S. patent application Ser. No. 09/332,448, main facility 12 may schedule videos for distribution according to a promotional philosophy. As taught therein, promotional philosophies are selection algorithms that attempt to maximize the effectiveness of promotions by selecting promotions for distribution during times in which expected audiences will view the promotions. An operator at main facility 12 may, for example, generate one or more promotional philosophy templates that are used by main facility 12 to generate a national playlist of promotional events. The promotional philosophy templates and national playlist may be provided to application equipment 17 as part of the program guide data.

In approaches where alternative sources of videos are provided by main facility 12 to application equipment 17, such as in the store-and-forward approach described in above-mentioned Kern et al. U.S. patent application Ser. No. 09/332,448, equipment at application equipment 17 may generate a local playlist of promotional events according to the promotional philosophy templates. If the promotional events scheduled by the national playlist are unavailable or undesirable to the application equipment 17, the local playlist may schedule alternative videos instead of the undesirable ones scheduled by the national playlist. The application equipment 17 may generate program guide display screens with the nationally selected or alternative videos and program guide data according to the local playlist. The display screens are distributed to viewers for viewing on their televisions.

The videos supplied by main facility 12 may include promotional videos such as short videos (i.e., videos less than three minutes in length), video trailers promoting a television program, or the like. The videos may be supplied by video source 11. Video source 11 may be based, for example, on a library of video clips stored on a video juke box (a multiple-compact disc or digital video disc storage system) or any other suitable combination of hardware and software for storing such videos. Videos may be provided in any suitable format. For example, video signals may be provided in an analog signal format using the National Television Standards Committee (NTSC) signal format or in a digital signal format such as a Moving Picture Experts Group (MPEG) format.

If desired, data source 14 and video source 11 may be combined into a single information source. This information source may provide program guide data, videos, or any suitable combination thereof. The data provided by such an information source may be used by application equipment 17 to provide a passive guide, an interactive guide, or both. The videos may be used for whole screen or partial screen displays.

Program guide or other application data and videos may be transmitted by transmission system 24 to application equipment 17 via link 18. Transmission system 24 may include any equipment suitable for encoding the program guide data and videos and providing the encoded data and videos to transmitter 111. Transmitter 111 is preferably a digital satellite uplink transmitter, but may be any suitable analog, digital, radio frequency, optical, microwave, terrestrial, or other type of transmitter. Transmission system 24 may encode the data as, for example, component object model (COM) objects that are transmitted using an Internet based addressing scheme and Internet based transport and network protocols such as the user datagram protocol (UDP) and the Internet protocol (IP). Electronic program guide systems that transfer UDP packets and COM objects using a UDP/IP protocol stack are described in above-mentioned Gollahon et al. U.S. patent application Ser. No. 09/332,624, filed Jun. 11, 1999.

An interactive television program guide or other interactive software (e.g., a web browser, operating system software, or any other suitable software) is implemented on application equipment 17. Various architectures for interactive television program guide systems and various interactive guide features are described, for example, in above-mentioned Knudson et al. U.S. patent application Ser. No. 09/357,941, filed Jul. 16, 1999. Five illustrative arrangements for application equipment 17 are shown in FIGS. 2a-2e. As shown in FIGS. 2a-2d, application equipment 17 may include user television equipment 22 and equipment located at distribution facility 16.

Figure 2A:
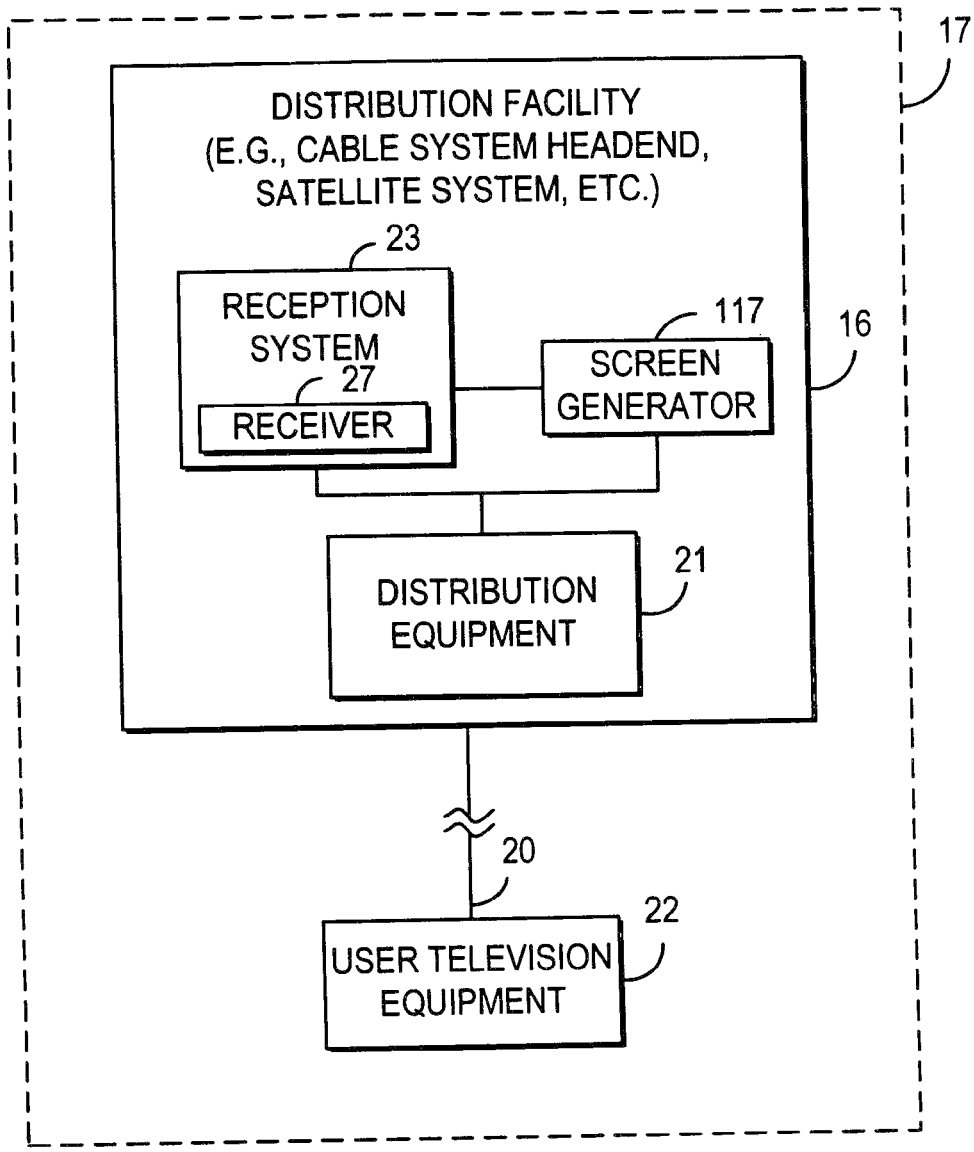
FIGS. 2a-2e show illustrative arrangements for the interactive application equipment of FIG. 1 in accordance with various embodiments of the present invention.
Figure 2B:
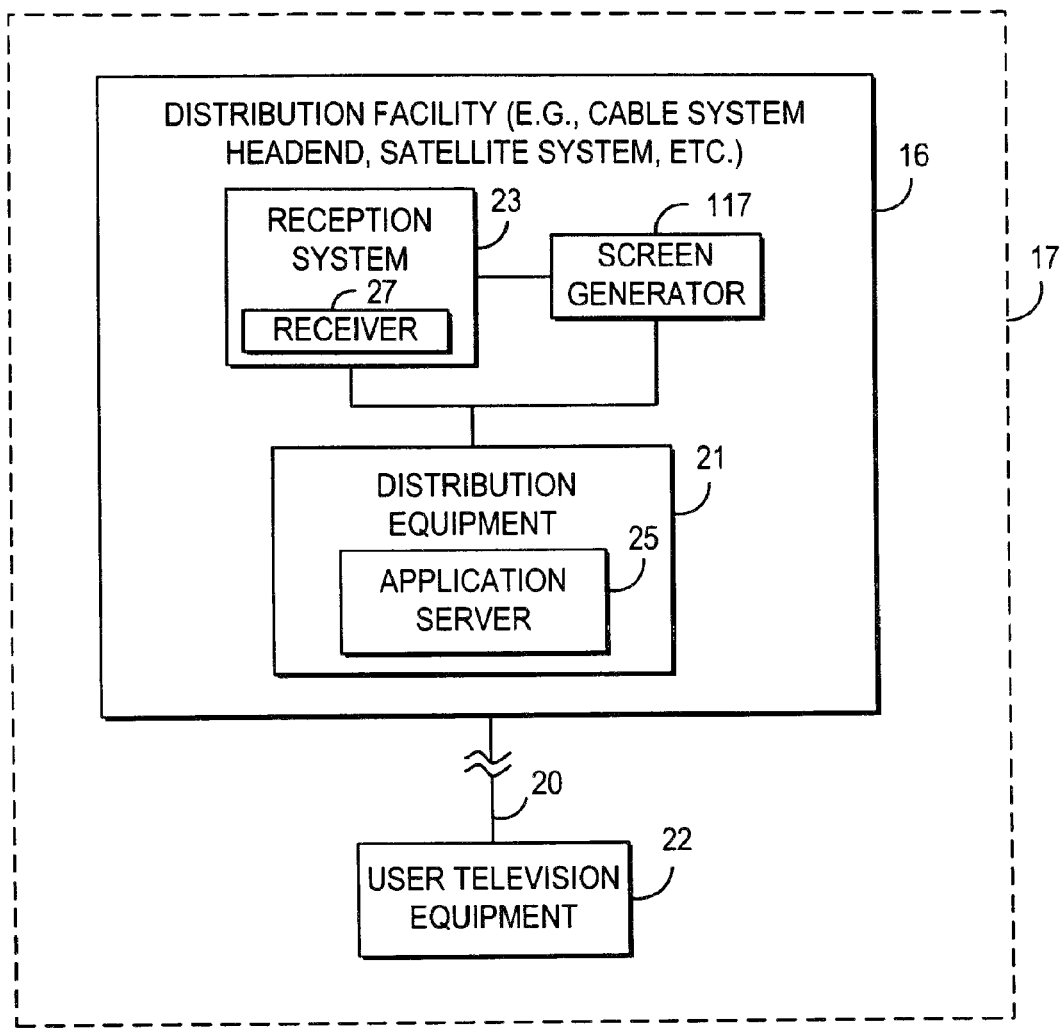
Figure 2C:
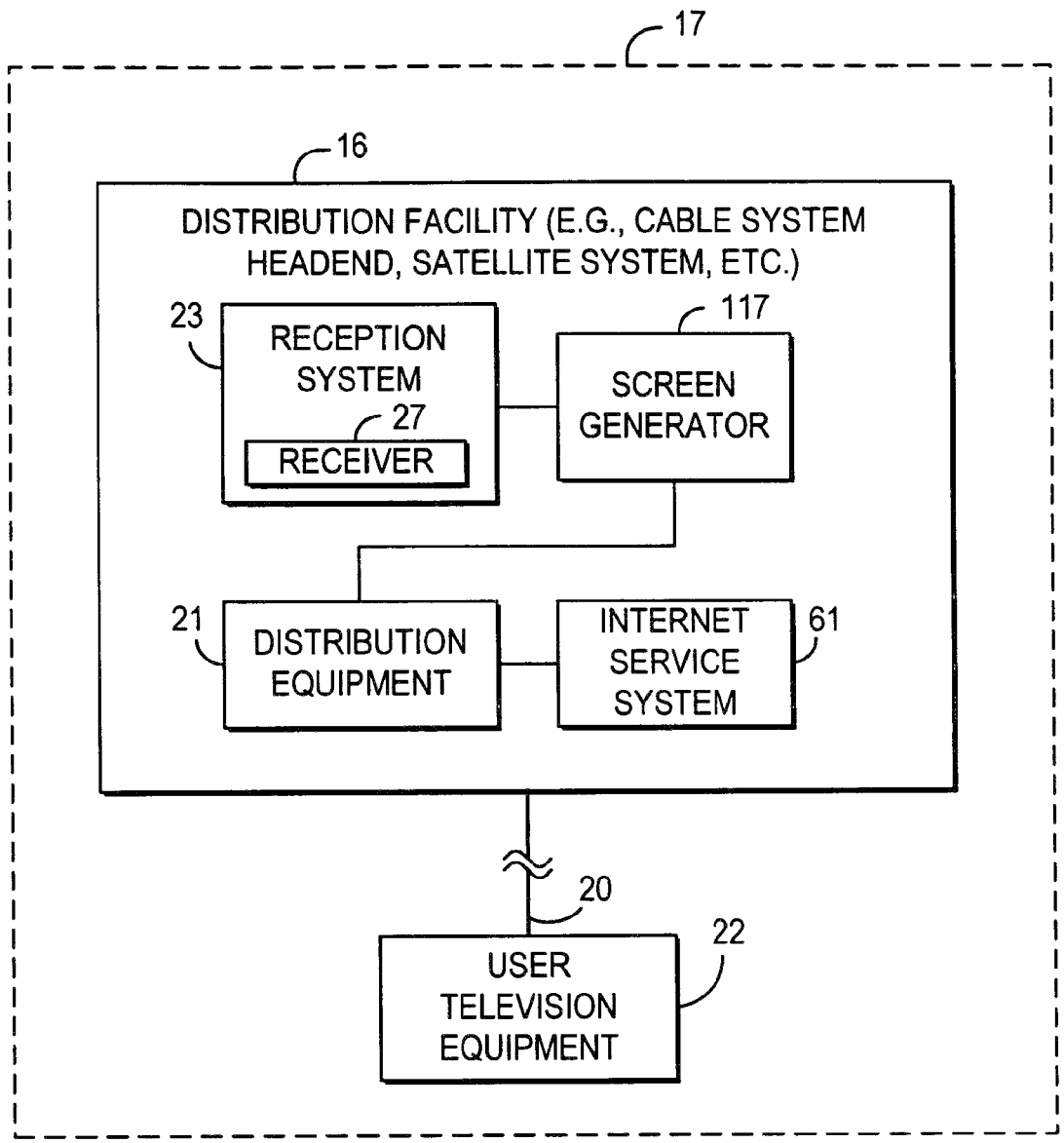
Figure 2D:
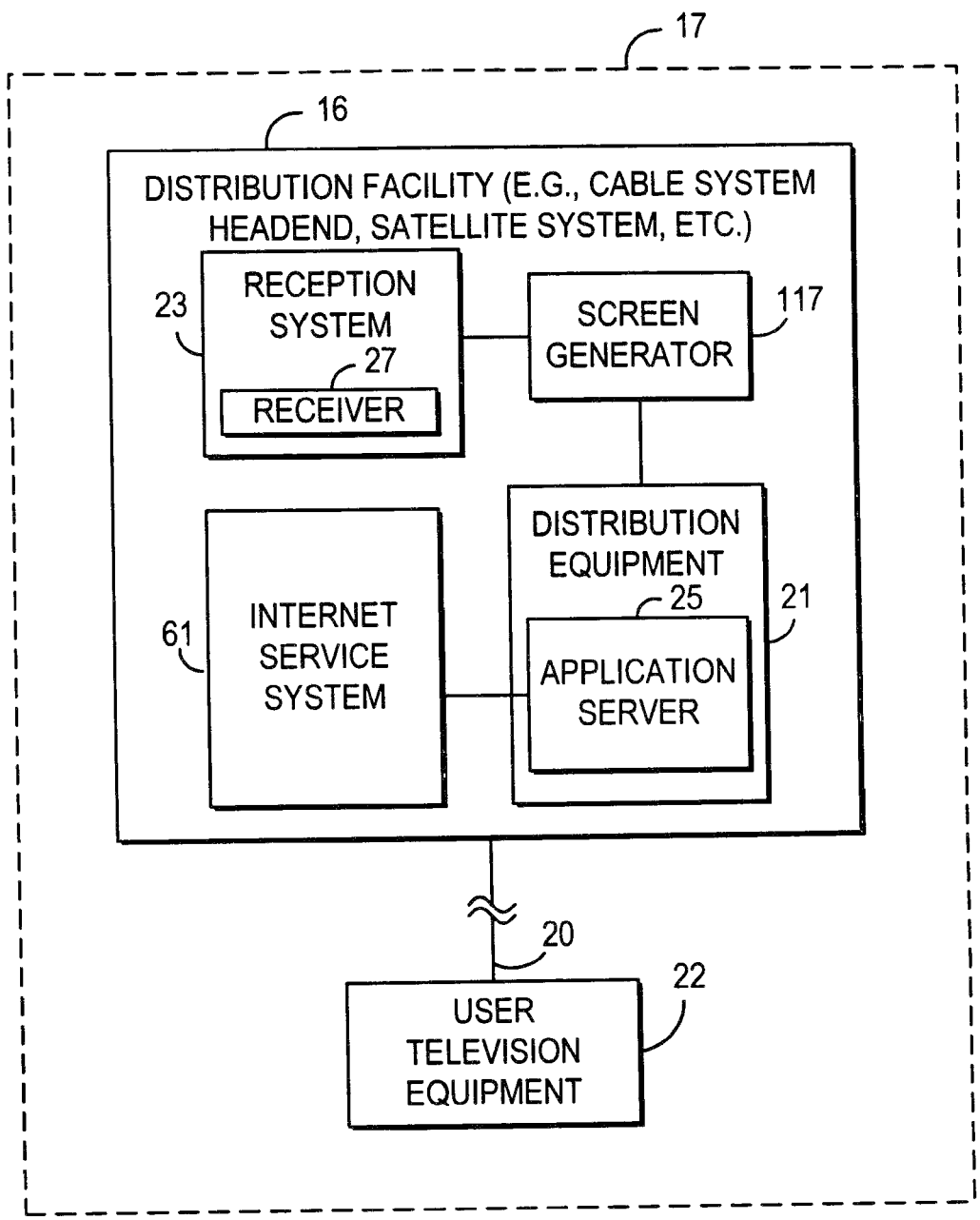

The interactive television program guide or other software may run totally on user television equipment 22 as shown in FIGS. 2a and 2c, or may run partially on user television equipment 22 and partially on distribution facility 16 using a suitable client-server or distributed processing approach as shown in FIGS. 2b and 2d.

As shown in FIGS. 2a-2e, distribution facility 16 may be any suitable distribution facility (e.g., a cable system headend, a broadcast distribution facility, a satellite distribution facility, or any other suitable type of distribution facility). As illustrated in FIGS. 2a-2d, distribution facility 16 may have reception system 23 for receiving videos, data, or a suitable combination thereof from transmitter 111 using receiver 27. Receiver 27 is preferably a digital satellite downlink receiver, but may be any suitable analog, digital, radio-frequency, optical, microwave, terrestrial, or other type of receiver.

Distribution facility 16 may have screen generator 117 for generating passive video product display screens containing videos and data Screen generator 117 may be implemented using any suitable hardware, software, or combination thereof. Screen generator 117, may be, for example, a Windows NT process running on a personal computer with a Pentium II microprocessor.

Screen generator 117 may use an object-oriented approach to generate video product display screens. The use of COM objects, for example, may allow changes to be made to the format and functionality of some of the features of system 10 without requiring changes to other system components.

Such an approach may allow one main facility 12 to provide and manage a number of different passive guides and other video products from a central location. Screen generators that may be used to create video product display screens using an object-oriented approach are described, for example, in Kern et al. U.S. patent application Ser. No. 09/332,539, filed Jun. 11, 1999, which is hereby incorporated by reference herein in its entirety.

Distribution equipment 21 may distribute passive video product display screens on a dedicated channel and, if desired, television programming on multiple analog or digital channels, to multiple users via communications paths 20. Distribution equipment 21 may include, for example, a cable headend modulator, and any other or additional equipment suitable for transmitting television programming and passive guide display screens over communications paths 20. Alternatively, distribution equipment 21 may include suitable hardware and software for delivering videos in real-time or substantially real-time via the Internet (e.g., using the M-bone). If desired, television programming and video products may be provided over separate communications paths.

Distribution equipment 21 of FIGS. 2a-2d may also include suitable hardware for providing program guide or other application data to user television equipment 22 over communications path 20. Distribution equipment 21 may include, for example, suitable transmission hardware for distributing program guide data on a television channel sideband, in the vertical blanking interval of a television channel, using an in-band digital signal, using an out-of-band digital signal, or by any other suitable data transmission technique. The data may, for example, be provided over a phone line when communications path 20 include separate paths for data and television signals.

Communications path 20 may be any communications path or paths suitable for distributing program guide or other application data. Communications path 20 may include, for example, a satellite link, a telephone network link, a cable or fiber optic link, a microwave link, an Internet link, a data-over-cable service interface specification (DCCSIS) link, a digital subscriber line (DSL) link, a combination of such links, or any other suitable communications link. Communications path 20 may allow distribution facility 16 to distribute television programming to user television equipment 22. There are typically multiple pieces of user television equipment 22 and multiple associated communications paths 20, although only one piece of user television equipment 22 and communications path 20 are shown in FIGS. 2a-2d to avoid over complicating the figures. If desired, television programming may be provided over separate communications paths (not shown).

FIG. 2b shows an illustrative arrangement for application equipment 17 in a client-server based or distributed interactive program guide system. The approach shown in FIG. 2b may also be used to provide other applications. As shown in FIG. 2b, distribution equipment 21 may include application server 25. Application server 25 may be any suitable software, hardware, or combination thereof for providing a client-server based program guide. Application server 25 may, for example, run a suitable database engine (e.g., SQL Server by Microsoft) and provide program guide data, passive guide characteristics, or any suitable combination thereof, in response to queries generated by a program guide client implemented on user television equipment 22. Alternatively, application server 25 may poll the program guide client and provide data when necessary. If desired, application server 25 may be located at main facility 12 or some other location (not shown).

A program guide or other application client running on user television equipment 22 may retrieve program guide data, passive guide characteristics, or any suitable combination thereof, from application server 25 using any suitable client-server based approach. The program guide client may, for example, pass SQL requests as messages to application server 25. In another suitable approach, the program guide or other application may invoke remote procedures that reside on application server 25 using one or more remote procedure calls. Application server 25 may execute SQL statements for such invoked remote procedures. In still another suitable approach, client objects executed by the program guide may communicate with server objects executed by application server 25 using, for example, an object request broker (ORB). This may involve using, for example, Microsoft's Distributed Component Object Model (DOOM) approach.

In another approach, program guide display pages may be generated at distribution facility 16 using a graphics engine or video production equipment. The display pages are then encoded into an MPEG or other suitable digital format for distribution. The program guide display pages may be decoded by a thin program guide client running on user television equipment 22 to produce program guide display screens seen by the user. Client-server based program guides of this type are described, for example, in Marshall et al. U.S. patent application Ser. No. 09/330,501, filed Jun. 11, 1999, which is hereby incorporated by reference herein in its entirety.

The program guide or other application client may communicate with application server 25 over communications path 20 using any suitable network and transport layer protocols, if desired. A protocol stack may be used which includes, for example, Sequenced Packet Exchange/Internetwork Packet Exchange (SPX/IPX) layers, Transmission Control Protocol/Internet Protocol (TCP/IP) layers, AppleTalk Transaction Protocol/Datagram Delivery Protocol (ATP/DDP) layers, or any other suitable network and transport layer protocols. If desired DOCSIS may also be used. A suitable client-server based approach may also be used for providing non-program guide software, if desired.

FIGS. 2c and 2d show illustrative Internet based systems for providing an interactive television program guide or other interactive application. Distribution facility 16 may, for example, include Internet service system 61. Internet service system 61 may use any suitable combination of hardware and software capable of obtaining or providing program guide or other application data, passive guide characteristics, or any suitable combination thereof, for or to the guide using an Internet based approach (e.g., the HyperText Transfer Protocol (HTTP)). If desired, Internet service system 61 may be located at a facility that is separate from distribution facility 16.

If the program guide or other application is implemented on user television equipment 22 of application equipment 17 as shown in FIG. 2c, Internet service system 61 (or other suitable equipment at program guide distribution facility 16 that is connected to Internet service system 61) may provide program guide or other application data, to user television equipment 22 via the Internet, or via distribution equipment 21 using any suitable Internet-based approach (e.g., using the HyperText Transfer Protocol (HTTP) or File Transfer Protocol (FTP) over a Transmission Control Protocol/Internet Protocol (TCP/IP) type link). If the program guide or other application implemented on application equipment 17 is a client-server application as shown in FIG. 2d, application server 25 may obtain program guide or other application data from Internet service system 61. Alternatively, the data may be provided by main facility 12 to distribution facility 16 via the Internet and Internet service system 61. The program guide data may be distributed by distribution equipment 21 to the guide using any suitable distribution scheme.

In still another embodiment, distribution equipment 21 may include suitable hardware (not shown) on which a first portion or version of the interactive television program guide or other software may be implemented. A second portion or version of the program guide or other software may be implemented on user television equipment 22. The two versions or portions of the interactive program guide or other software may communicate using any suitable peer-to-peer communications scheme (e.g., messaging, remote procedure calls, etc.) and perform interactive program guide or other functions distributively between distribution facility 16 and user television equipment 22.

Figure 2E:
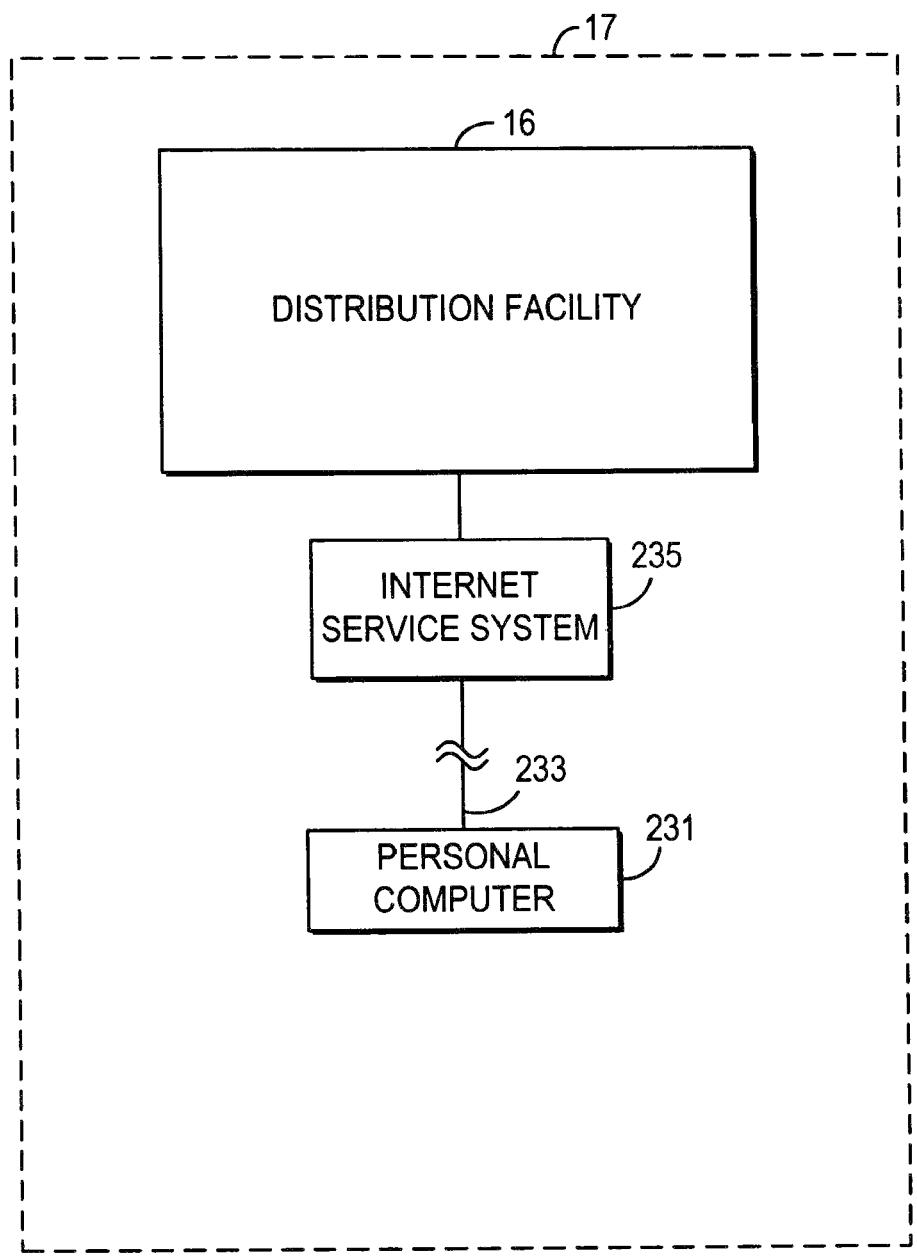

Another suitable arrangement in which an on-line program guide or other software may be implemented on application equipment 17 is shown in FIG. 2e. On-line program guide systems are described, for example, in Boyer et al. U.S. patent application Ser. No. 08/938,028, filed Sep. 18, 1997, which is hereby incorporated by reference herein in its entirety. The user may have personal computer (PC) 231 on which a program guide client or web browser is implemented. Personal computer 231 may be connected to Internet service system 235 via Internet link 233. Internet service system 235 may use any suitable combination of computer hardware and software capable of providing an on-line program guide or other server application or web site.

Figure 3:
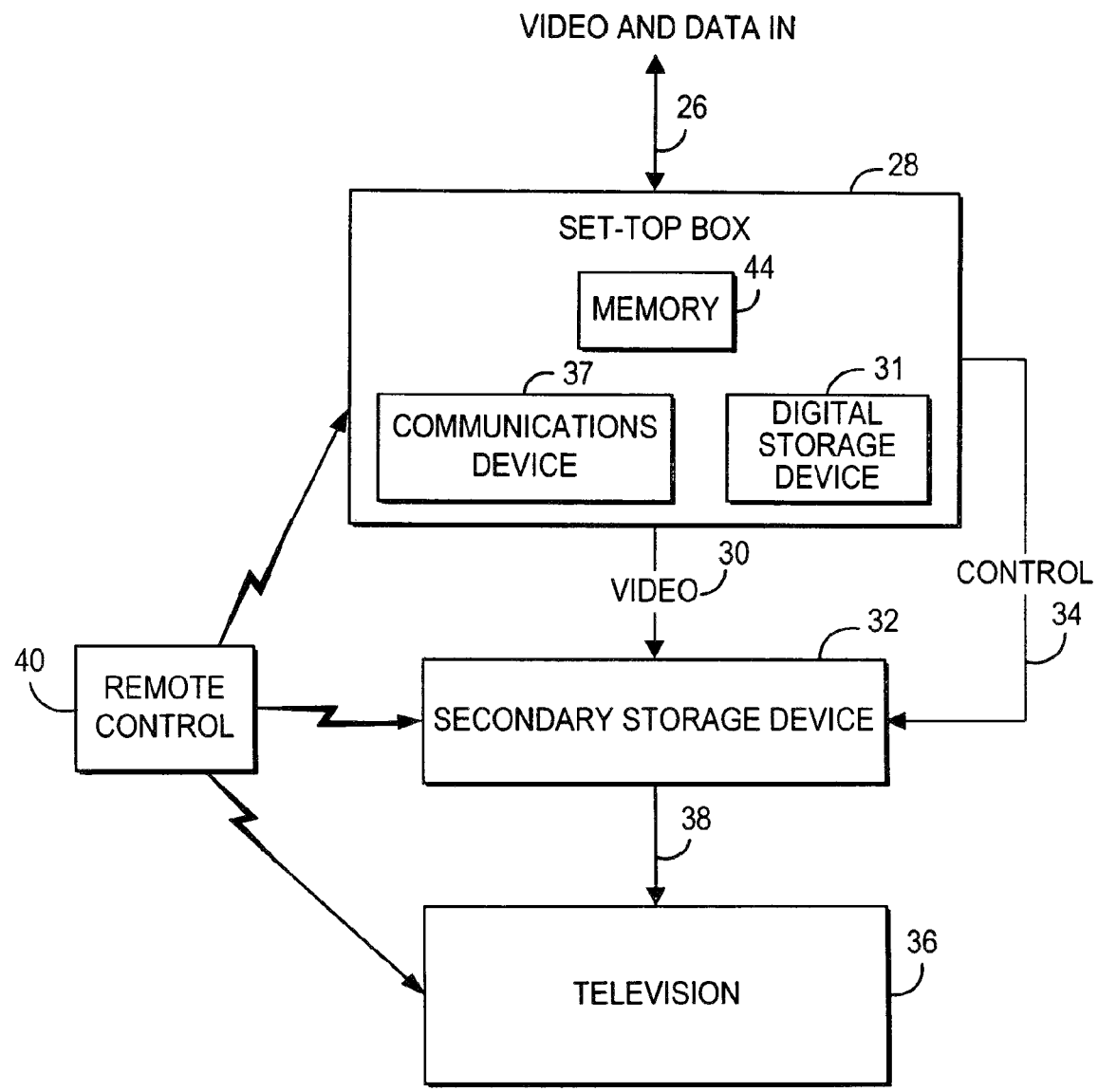
FIG. 3 is an illustrative schematic block diagram of the user television equipment of FIGS. 2a-2d in accordance with one embodiment of the present invention.

An illustrative arrangement for user television equipment 22 is shown in FIG. 3. As shown, user television equipment 22 may receive video signals and data from distribution facility 16 or application server 25 at input 26. During normal television viewing, a viewer may tune set-top box 28 to a desired television channel. The signal for that television channel may then be provided at video output 30. The signal supplied at output 30 may be a radio-frequency (RF) signal on a predefined channel (e.g., channel 3 or 4), an analog demodulated video signal, a digital signal provided to television 36 on an appropriate digital bus (e.g., a bus using the Institute of Electrical and Electronics Engineers (IEEE) 1394 standard, (not shown)), or any other suitable output. The video signal at output 30 is received by optional secondary storage device 32.

The interactive television program guide or other software may run on set-top box 28, on television 36 (if television 36 has suitable processing circuitry and memory), on a suitable analog or digital receiver connected to television 36, or on digital storage device 31 if digital storage device 31 has suitable processing circuitry and memory. The interactive television program guide or other software may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set-top box 28 using control path 34. If secondary storage device 32 is a videocassette recorder, for example, a typical control path 34 involves the use of an infrared transmitter coupled to an infrared receiver in the videocassette recorder that normally accepts commands from a remote control such as remote control 40. Remote control 40 may be used to control set-top box 28, secondary storage device 32, and television 36.

If desired, a user may record programs, program guide data, passive guide videos, or a combination thereof in digital form on optional digital storage device 31. Digital storage device 31 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. Digital storage device 31 may, for example, be contained in a local media server. If necessary, processing circuitry in set-top box 28 formats the received video, audio and data signals into a digital file format. Preferably, the file format is an open file format such as the Moving Picture Experts Group (MPEG) MPEG-2 standard or the Moving Joint Photographic Experts Group (MJPEG) standard. The resulting data is streamed to digital storage device 31 via an appropriate bus (e.g., a bus using the Institute Electrical and Electronics Engineers (IEEE) 1394 standard), and is stored on digital storage device 31. In another suitable approach, an MPEG-2 data stream or series of files may be received from distribution equipment 21 (FIGS. 2*a*-2*d*) and stored.

Television 36 receives video signals from secondary storage device 32 via communications path 38. The video signals on communications path 38 may be generated by secondary storage device 32 when playing back a prerecorded storage medium (e.g., a videocassette or a recordable digital video disc), may be generated by digital storage device 31 when playing back a pre-recorded digital medium, may be passed through from set-top box 28, may be provided directly to television 36 from set-top box 28 if secondary storage device 32 is not included in user television equipment 22, or may be received directly by television from input 26 when, for example, set-top box 28 is not included in user television equipment 22. During normal television viewing, the video signals provided to television 36 correspond to a desired channel to which a viewer has tuned set-top box 28.

Set-top box 28 may have memory 44. Memory 44 may be any memory or other storage device, such as a random access memory (RAM), read only memory (ROM), flash memory, a hard disk drive, a combination of such devices, etc., that is suitable for storing instructions, data, or a suitable combination thereof for use by the program guide or other application.

In client-server based approaches, set-top box 28 may have communications device 37 for communicating directly with application server 25 (FIG. 2*d*) or Internet service system 61 (FIG. 2*d*) over communications path 20 (FIG. 2*d*). Communications device 37 may be a modem (e.g., any suitable analog or digital standard, cellular, or cable modem), network interface card (e.g., an Ethernet card, Token ring card, etc.), or other suitable communications device. Television 36 may also have such a suitable communications device if desired.

In an alternative approach, user television equipment 22 (FIG. 2*d*) may communicate with Internet service system 61 (FIG. 2*d*) via distribution equipment (FIG. 2*d*) using our comments path 20 or another suitable communication path.

Figure 4:
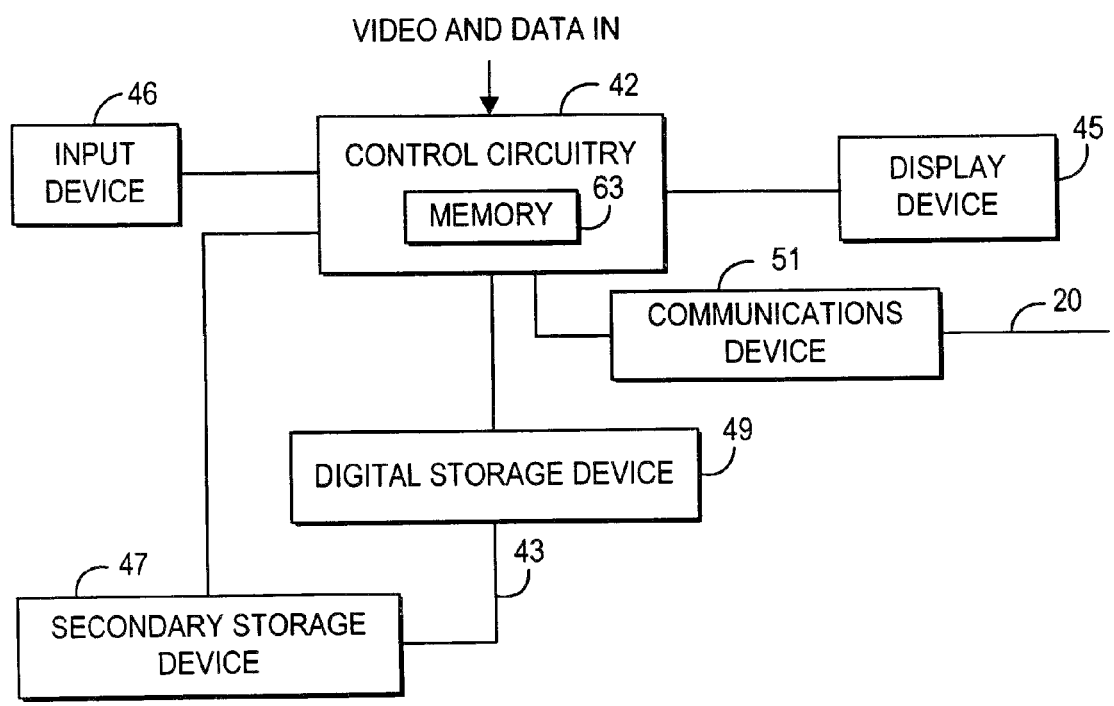
FIG. 4 is a generalized schematic block diagram of portions of the illustrative user television equipment of FIG. 3 in accordance with one embodiment of the present invention.

A more generalized embodiment of user television equipment 22 of FIG. 3 is shown in FIG. 4. As shown in FIG. 4, program guide data from distribution facility 16 is received by control circuitry 42 of user television equipment 22. The functions of control circuitry 42 may be provided in set-top box 28. Alternatively, these functions may be integrated into an advanced television receiver, personal computer television (PC/TV), personal computer 231 or any other suitable arrangement. If desired, a combination of such arrangements may be used.

User television equipment 22 may also have secondary storage device 47 and digital storage device 49 for recording programming. Secondary storage device 47 may be any suitable type of analog or digital program storage device (e.g., a videocassette recorder, a digital versatile disc (DVD), etc.). Program recording and other features may be controlled by control circuitry 42. Digital storage device 49 may be, for example, a writeable optical storage device (such as a DVD player capable of handling recordable DVD discs), a magnetic storage device (such as a disk drive or digital tape), or any other digital storage device.

User television equipment 22 may also have memory 63. Memory 63 may be any memory or other storage device, such as a random access memory (RAM), read only memory (ROM), flash memory, a hard disk drive, a combination of such devices, etc., that is suitable for storing instructions, data, or a suitable combination thereof for use by control circuitry 42.

User television equipment 22 may also have communications device 51 for communicating with distribution equipment 21 (FIG. 2*a*), application server 25 (FIG. 2*b*), or Internet service system 61 (FIGS. 2*c*-2*d*) via communications path 20. Communications device 51 may be a modem (e.g., any suitable analog or digital standard, cellular, or cable modem), network interface card (e.g., an Ethernet card, Token ring card, etc.), or other suitable communications device.

A user may control the operation of user television equipment 22 with user input device 46. User input device 46 may be a pointing device, wireless remote control, keyboard, touch-pad, voice recognition system, or any other suitable user input device. To watch television, a user may instruct control circuitry 42 to display a desired television channel on display device 45. Display device 45 may be any suitable television, monitor, or other suitable display device. To access the functions of the program guide or other software, a user may instruct the program guide or other software implemented on application equipment 17 to generate a main menu or other desired display screen for display on display device 45.

For purposes of clarity, and not by way of limitation, suitable displays for an interactive program guide are now described herein below. These displays and their approaches for providing advertisements and merchandising opportunities are only illustrative and similar displays, display elements, and approaches may be used for other applications. For example, panel advertisements and other display elements may be incorporated into other applications.

Figure 5:
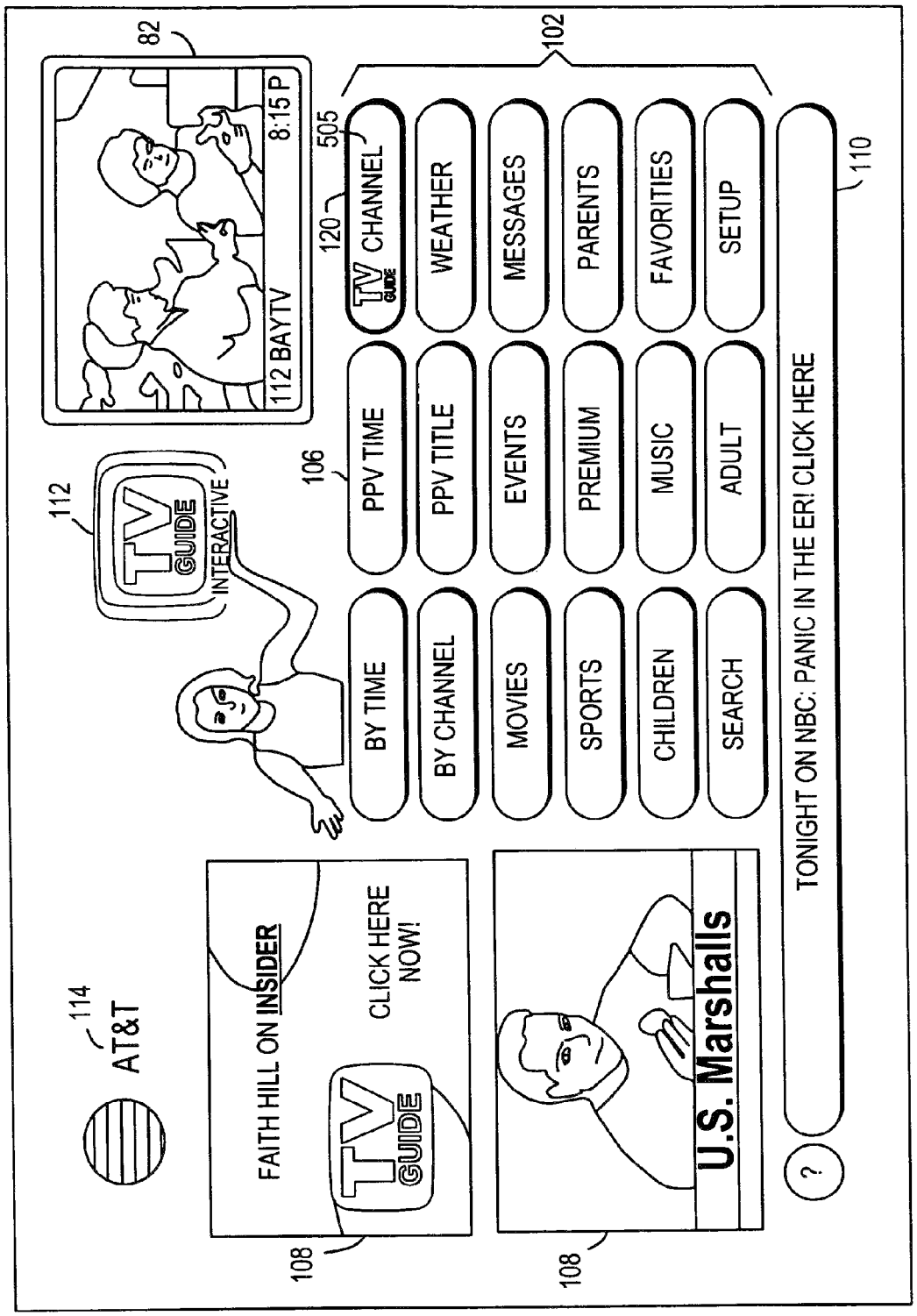
FIG. 5 is an illustrative interactive television program guide main menu screen in accordance with one embodiment of the present invention.

Turning first to FIG. 5, a main menu screen 100 is shown. Main menu screen 100 may be accessed by pressing a "guide" key on remote control 40. As illustrated, screen 100 may include menu 102 of selectable program guide features 106. If desired, program guide features 106 may be organized according to feature type. In menu 102, for example, program guide features 106 have been organized into three columns. The interactive television program guide may generate a display screen for a particular program guide feature when a user selects that feature from menu 102 with, for example, highlight region 120.

Main menu screen 100 may include one or more selectable advertisements 108. Selectable advertisements 108 may, for example, include text and graphics advertising pay-per-view programs or other programs, channels, or products. When a user selects a selectable advertisement 108 with, for example, highlight region 120, the program guide may display information (e.g., pay-per-view information) or take other actions related to the content of the advertisement. Pure text advertisements may be presented, if desired, as illustrated by selectable advertisement banner 110.

Main menu screen 100 may also include other screen elements. The brand of the program guide product may be indicated, for example, using a product brand logo graphic such as product brand logo graphic 112. The identity of the television service provider may be presented, for example, using a service provider logo graphic such as service provider logo graphic 114. The logos may be included in the program guide data allowing for on-the-fly configurability of the display screens. Video window 501 may include video from a currently tuned channel.

The user may access a passive video product from an interactive guide or other software. If desired, the interactive guide or other software may include one or more branded screen elements, such as illustrative branded menu feature 505, to provide the user with an opportunity to access a passive video product. In this example, the user is provided with an opportunity to access the TV Guide Channel, a passive guide, directly from menu 102. In response to the user selecting branded feature 505, the interactive guide or other software may tune the user's equipment (e.g., television 36 or personal computer 231) to the channel on which the passive guide is carried.

Figure 6:
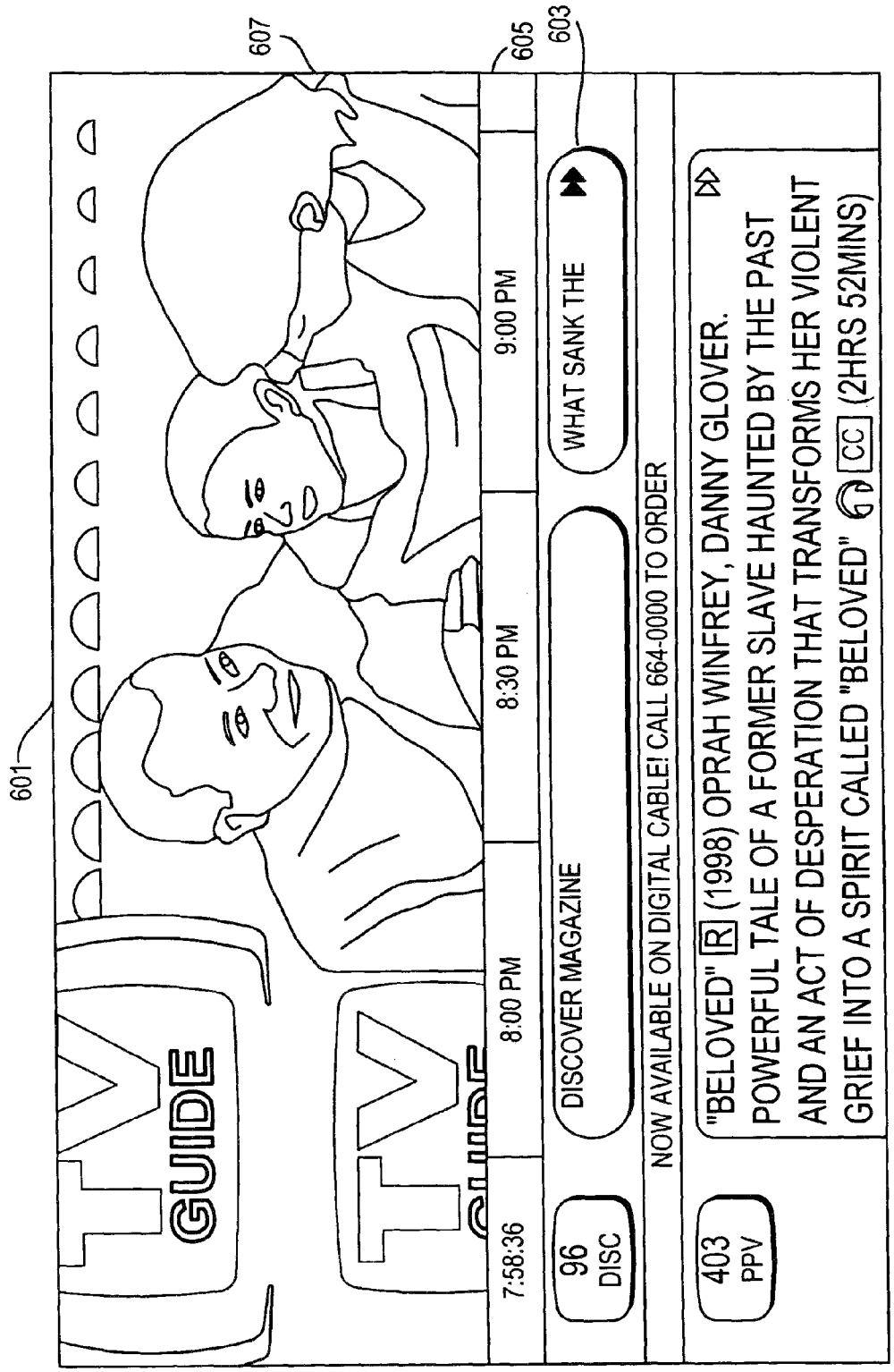
FIG. 6 is an illustrative passive guide display screen in accordance with one embodiment of the present invention.

FIG. 6 shows an illustrative passive guide display screen 601. Display screen 601 includes a half-screen video display area 607, a half-screen listings area 603, and separator bar 605. Separator bar 605 may display the current time and indicate the time slots for which listings are displayed. The program listings may scroll continuously or page periodically to display program listings for additional channels. Program listings may be displayed in sub-sets according to one or more organization criteria and sorted in various ways.

Passive guide display screen 601 is only illustrative of one suitable passive video product. Passive video product display screens may include any suitable combination of videos, listings, text, graphics and other content. For example, passive video products may include a near-full-screen video of a promoted program, plus a small text area with ordering details for the promoted program (e.g., a barker channel). Alternatively, they may include a quarter-screen video, accompanied by quarter screen text with ordering or viewing instructions, and a half-screen of scrolling program listings. These examples are merely illustrative, and other passive video product approaches may be used.

Figure 7:
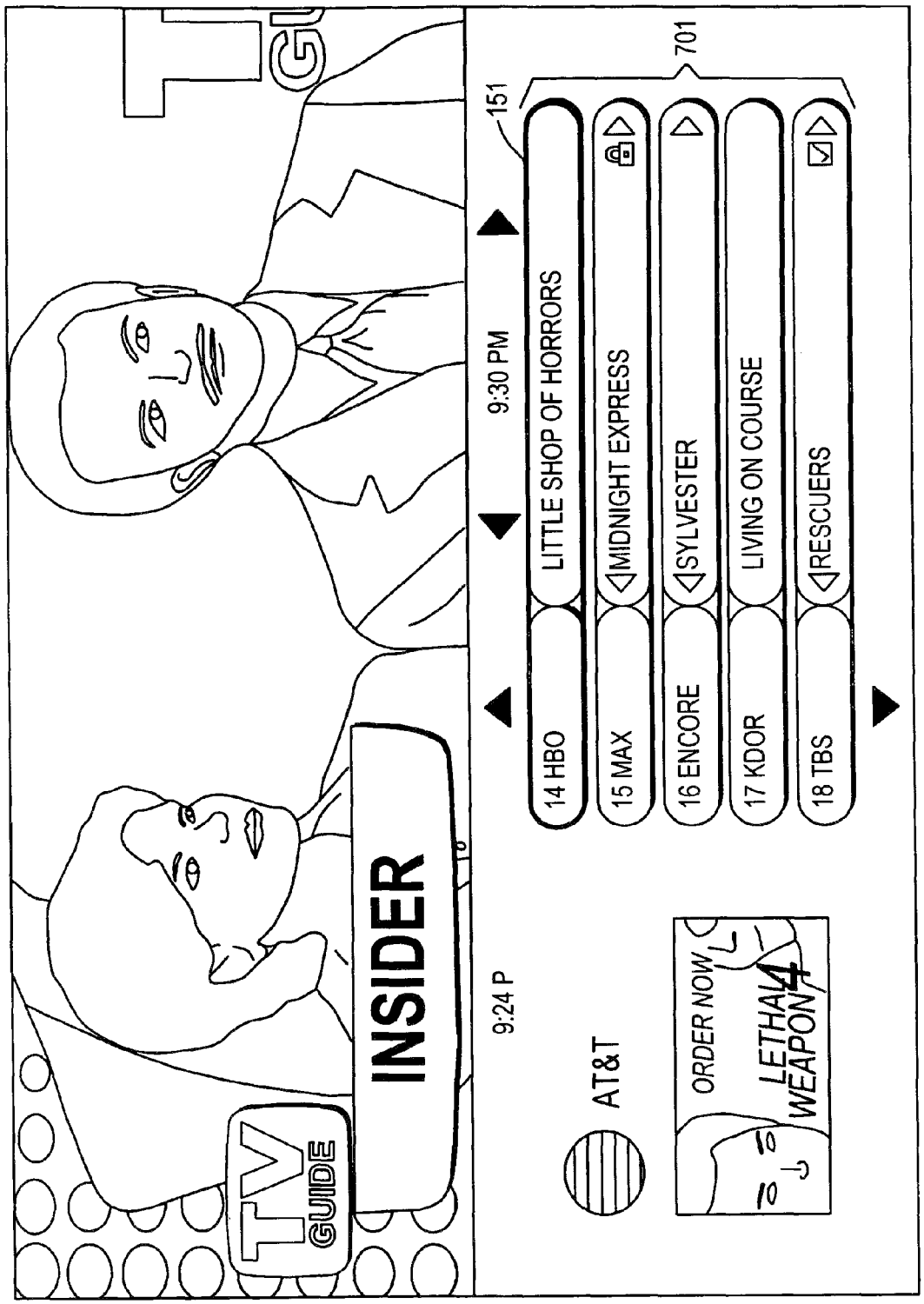
FIG. 7 is an illustrative hybrid guide display screen in accordance with one embodiment of the present invention.

If desired, program listings area 603 may be replaced or overlaid with interactive program listings to provide the user with a hybrid passive/interactive television program guide. The hybrid guide may be generated by the interactive guide using any suitable technique to overlay program listings display areas, text display areas, graphic display areas, video display areas, or interactive feature areas onto the passive guide display screen, or to otherwise replace passive guide content. Interactive feature areas may include any suitable interactive program guide feature and may replace or supplement a passive feature of the passive guide. The interactive guide may also generate the hybrid guide immediately when a user tunes to the passive guide channel. Hybrid passive/interactive television program guides are described, for example, in Reynolds et al. U.S. patent application Ser. No. 09/400,391, filed Sep. 21, 1999, which is hereby incorporated by reference herein in its entirety. An illustrative hybrid passive/interactive program guide is shown in FIG. 7.

The interactive guide may, for example, overlay a passive listings display area (e.g., program listings area 603 of FIG. 6) with an interactive listings area in response to a user indicating a desire to select a program listing by, for example, pressing an arrow key on remote control 40. The interactive guide may determine the first program listing displayed and may display the interactive listings starting with that first program listing. The interactive guide may determine the current time slot and channel that are being displayed by the passive guide based, for example, on passive guide characteristics (e.g., currently displayed screen components, size and location of screen components, current listings, etc.). Systems in which passive guide characteristics are used to synchronize passive and interactive program listings are described, for example, in above-mentioned Reynolds et al. U.S. patent application Ser. No. 09/400,391, filed Sep. 21, 1999. In still another suitable approach, the interactive guide may determine the type of listings displayed (e.g., whether they are movie listings, spots listings, etc.), and display interactive listings for the same type.

The interactive guide may indicate to a user that a hybrid guide is active by, for example, displaying a highlight region. FIG. 7 shows an illustrative hybrid guide having interactive grid 701 and highlight region 151. The operation of grid 701 may be similar to full-screen television listings displays as described, for example, in above-mentioned Knudsen et al. U.S. patent application Ser. No. 09/357,941, filed Jul. 16, 1999. The user may position highlight region 151 by entering appropriate commands with user input device 46. For example, if user input device 46 has a keypad, the user can position highlight region 151 using "up," "down," "left," and "right" using, for example, cursor keys on user input device 46. Alternatively, a touch sensitive screen, trackball, voice commands, or other suitable device may be used to move highlight region 151 or to select program listings without the use of highlight region 151. In still another approach, the user may speak the title of a television program listing into a voice request recognition system which will issue an appropriate command or request to the interactive guide. Any other suitable approach may also be used. In response to the user positioning highlight region 151, the guide may display interactive listings for additional channels (e.g., when the user positions highlight region 151 up or down), or for additional time slots (e.g., when the user positions highlight region 151 left or right)

Figure 8:
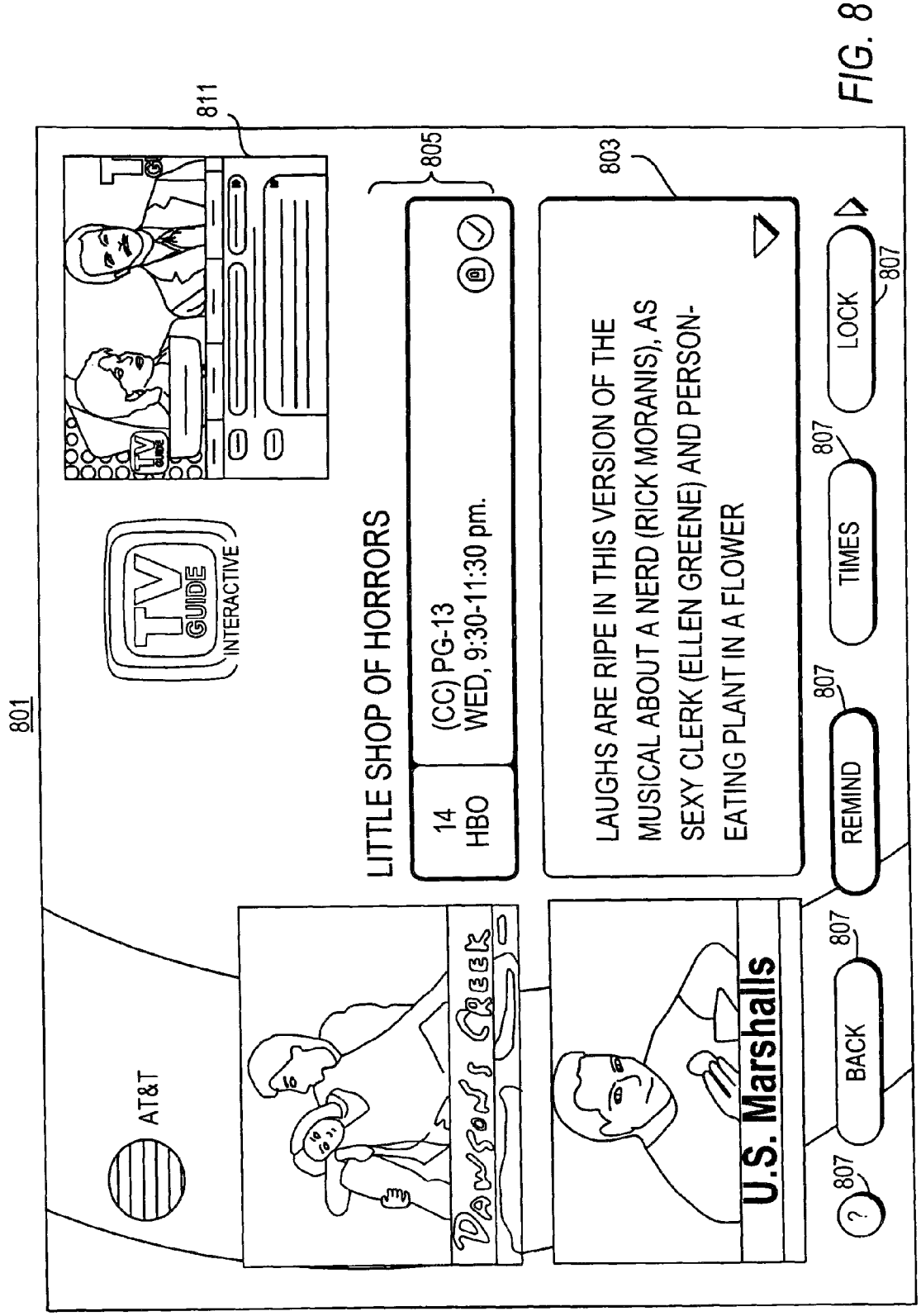
FIG. 8 is an illustrative information screen in accordance with one embodiment of the present invention.

The user may indicate a desire to access additional information for a program by, for example, pressing an info key on remote control 40. In response, the interactive guide may display an additional information screen for the currently highlighted program listing. FIG. 8 shows illustrative information screen 801. Information screen 801 may include, for example, an area 805 that displays the title, channel, rating, and air time of the program. Information screen 801 may also include other information, such as a description of the program, in window 803. Video window 811 may display the currently tuned channel. When the user accesses information screen 801 from a hybrid guide or from the passive video product, video window 811 may display the passive video product. Information screen 801 may also provide selectable features 807 for providing users with access to other interactive guide features. Interactive program guide systems in which additional information screens provide users with access to interactive guide features are described, for example, in Rudnick et al. U.S. patent application Ser. No.

09/356,268, filed Jul. 16, 1999, which is hereby incorporated by reference herein in its entirety.

The system may integrate program sponsorship and interactive advertising between conventional programming or one or more video products and interactive software such as an interactive television program guide. The interactive television program guide or other software may include, for example, one or more graphic advertisements, such as selectable graphics 108 (FIG. 5). Selectable graphics 108 may promote any suitable product or service. When a promotion is aired on the passive video product or within other programming, the interactive guide or other software may display an interactive advertisement indicating the promotion and, if applicable, its sponsor. In response to the user selecting the interactive advertisement, the interactive guide may tune the user's equipment to the passive video product or other channel.

The interactive guide may be programmed to display a linked interactive advertisement using any suitable approach. For example, the program guide data may include a schedule (i.e., a timing synch) that indicates to the interactive guide scheduled times for linked interactive advertisements. In another suitable approach, a passive video product may include, for example, a flag in its header (e.g., in its vertical blanking interval (VBI)) that alerts the interactive guide (or other hardware or software running in the user's equipment) to find and retrieve interactive content for a particular advertiser. If desired, this communications-based synchronization approach may be combined with the aforementioned timing-based synchronization approach. For example, interactive graphics may be downloaded to an interactive guide at the same time (or substantially the same time) that the promotions are provided to distribution facilities within the system. Such an approach may provide the system provider or some other interested entity with an opportunity to collect advertisement revenues for time blocks across multiple platforms. For example, time blocks may be sold for time on two products—a passive video product and an interactive program guide.

In one suitable approach, the interactive guide may be provided with playlists that schedule the passive guide promotions, and with passive guide characteristics. Passive guide characteristics include information that indicates what content is displayed by the passive video product, as well as how the content is being displayed. Systems in which playlists and passive video product characteristics are provided to an interactive guide to integrate passive video product and interactive guide content and functionality are described, for example, in above-mentioned Reynolds et al. U.S. patent application Ser. No. 09/400,391, filed Sep. 21, 1999.

Screen generator 117 (FIGS. 2a-2d) may track passive guide characteristics such as the currently displayed screen components of the passive video product display screen (e.g., videos, program listings grid, etc.), the size and location of the components, the listings that are being displayed, the period with which listings are paged or the speed with which listings are scrolled, which program segment is currently active in the video portion of the passive video product, the content of the videos (e.g., programs or products that are promoted by a video), the channel and call letters of the passive video product, a source identifier or other identifier of the passive video product, or any other suitable information. If desired, local or national playlists may also be provided to the interactive guide as part of the passive video product characteristics. The passive video product characteristics may be provided to distribution equipment 21 or application server 25 for use by the interactive television program guide. The passive video product characteristics may be provided to the guide or a guide client periodically, continuously, on-demand, or with any other suitable frequency based on the system architecture underlying the guide.

Figure 9A:
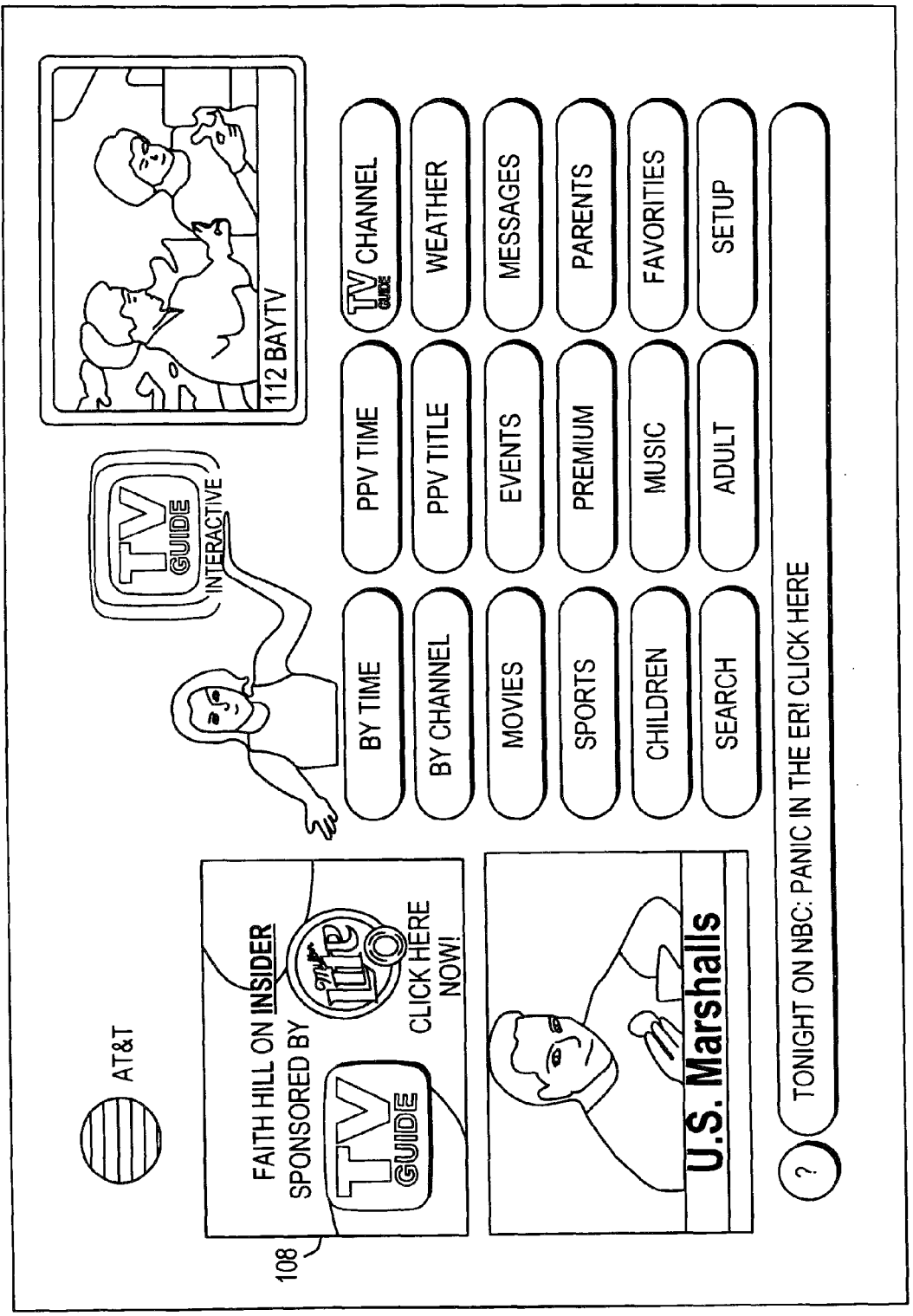
FIGS. 9a-9d show illustrative display screens for combining program sponsorship and interactive advertising in accordance with one embodiment of the present invention.
Figure 9B:
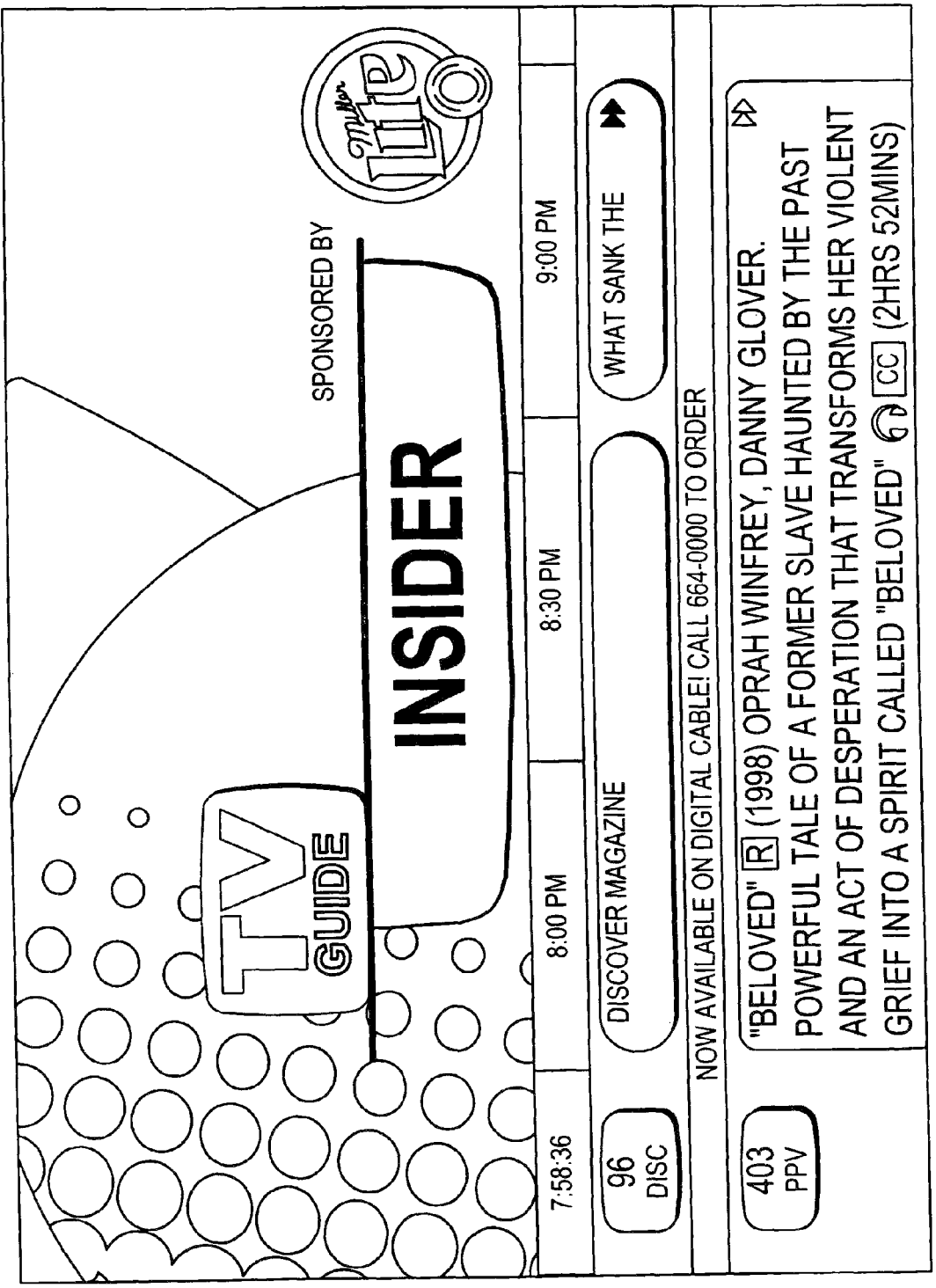
Figure 9C:
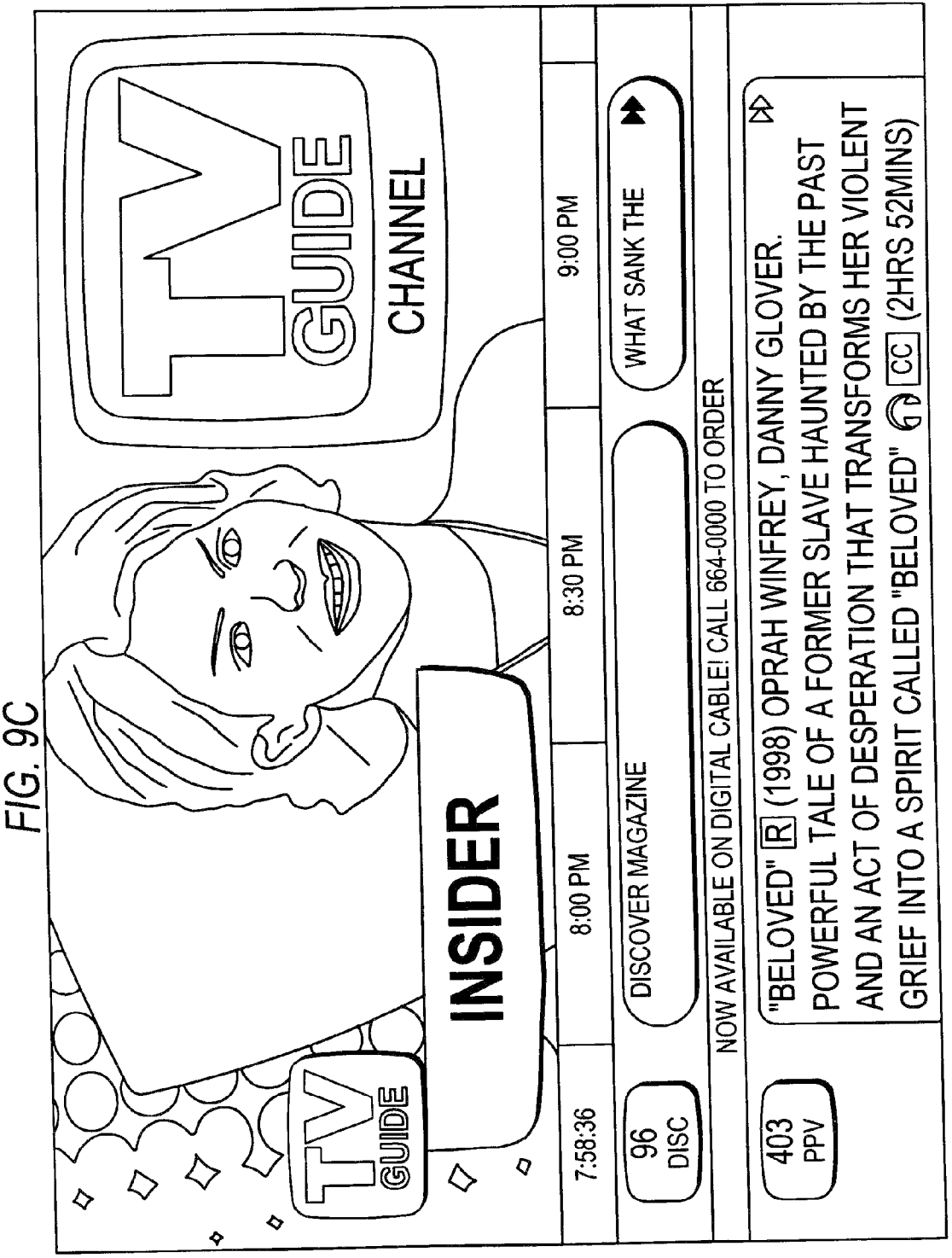
Figure 9D:
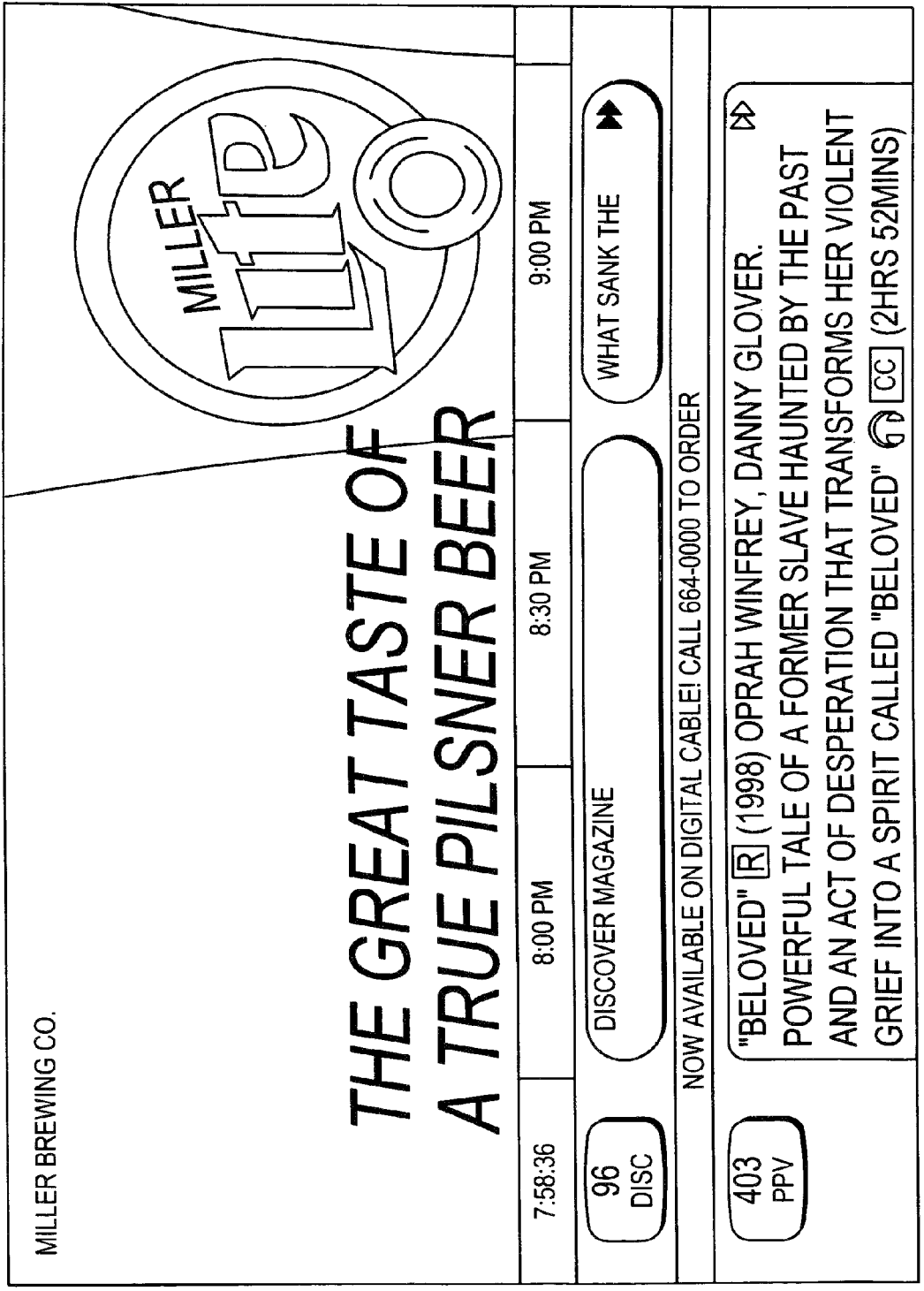

Comparing FIGS. 9a-9d illustrates how combining program sponsorship and interactive advertising between a passive guide and an interactive television program guide may be performed. In FIG. 9a, selectable advertisement graphic 108 of main menu screen 100 includes an advertisement for Faith Hill on Insider. The segment is sponsored by Miller Lite. This graphic is displayed in the interactive guide when the passive guide provides the sponsored segment. In response to the user selecting advertisement graphic 108, the interactive guide may tune the user's television or personal computer to the passive guide channel, where the sponsor identifier may appear on the video (FIG. 9b). In this example, the identifier may appear at the beginning of the segment. The segment may then air (FIG. 9c), and be followed by or interrupted by an advertisement for the sponsor (FIG. 9d). This approach may allow the provider of the interactive software (e.g., the interactive guide) and the passive video product (e.g., the passive guide) to sell time-blocks across multiple platforms. If desired, selectable advertisement graphic 108 may be provided by non-program guide software (e.g., a web browser, computer operating system, etc.).

Conventional television programming or passive video product promotions may be combined with interactive impulse-purchase features. The purchasing features may be provided by an interactive guide or by non-program guide software. For example, a passive video product segment or promotion (or a conventional television program) may promote or otherwise include information about particular products or services. When interactive content is available for the product or service, the interactive guide may overlay an alert icon onto the video signal to alert the user that interactive content is available. The interactive guide or other software may determine that there is related interactive content using any suitable approach. The programming may, for example, include a suitable header in its vertical blanking interval (VBI). Alternatively, the interactive software may be provided with characteristics of the programming and, if applicable, a playlist for the channel. Any other suitable approach may be used.

When the user selects such an icon, an interactive guide or other software may display a point-of-purchase window in which purchase information for the product or service is displayed. When the user completes the purchase, the guide or other software may return to full-screen display of the passive video product or conventional program. Alternatively, the user may be provided with an opportunity to order other merchandise from, for example, a TV Guide Store.

Figure 10A:
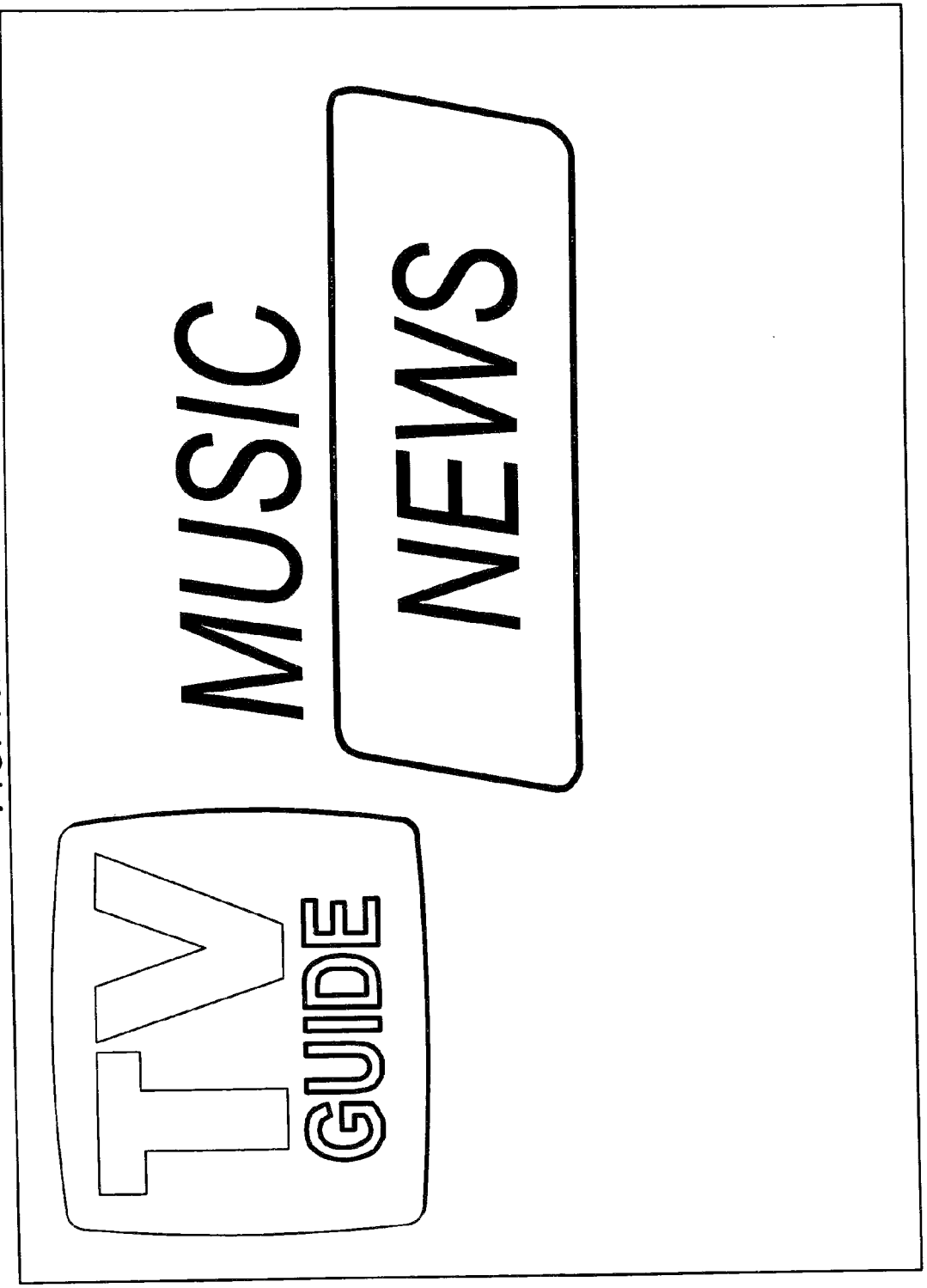
Figure 10B:
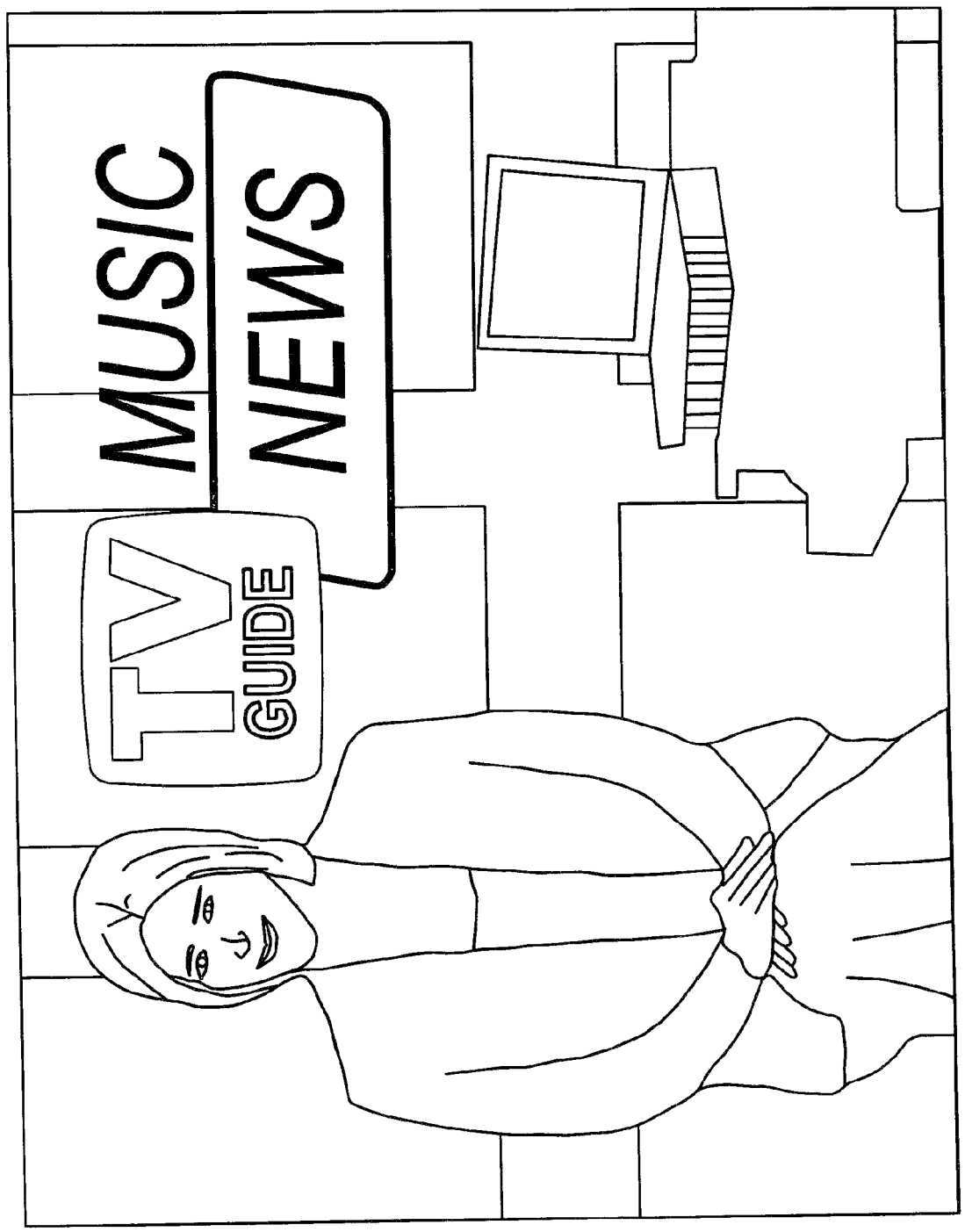
Figure 10C:
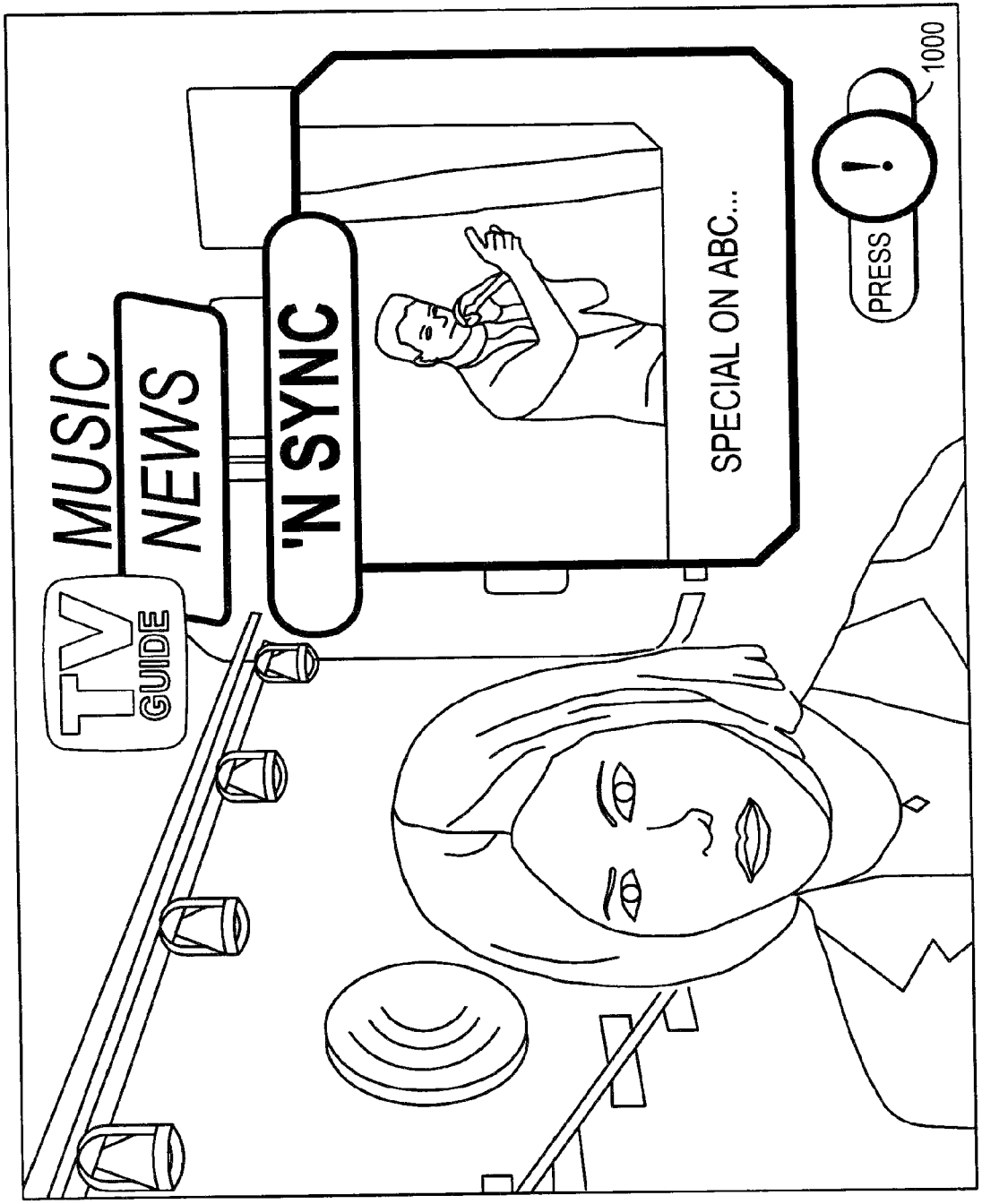
Figure 10D:
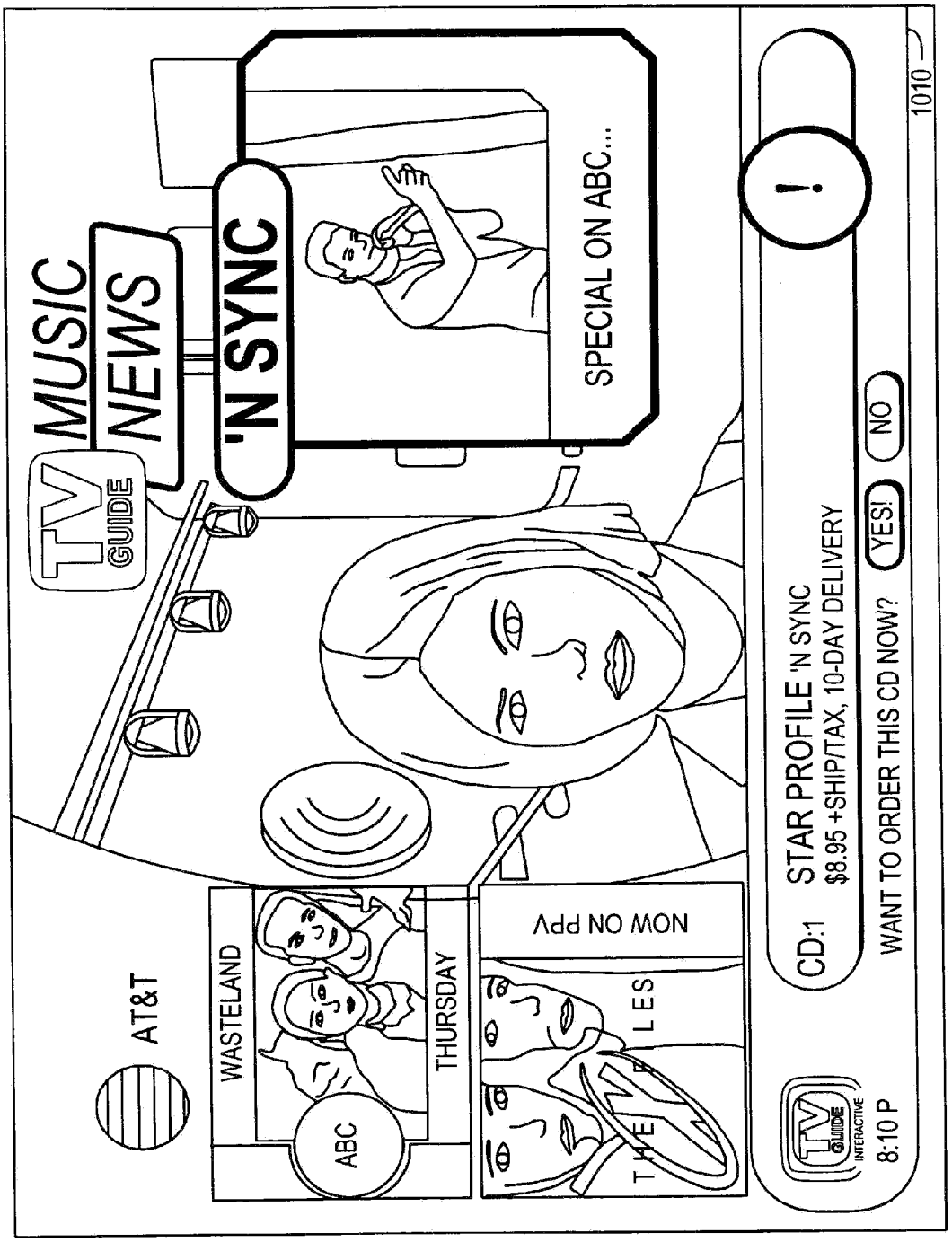
Figure 10E:
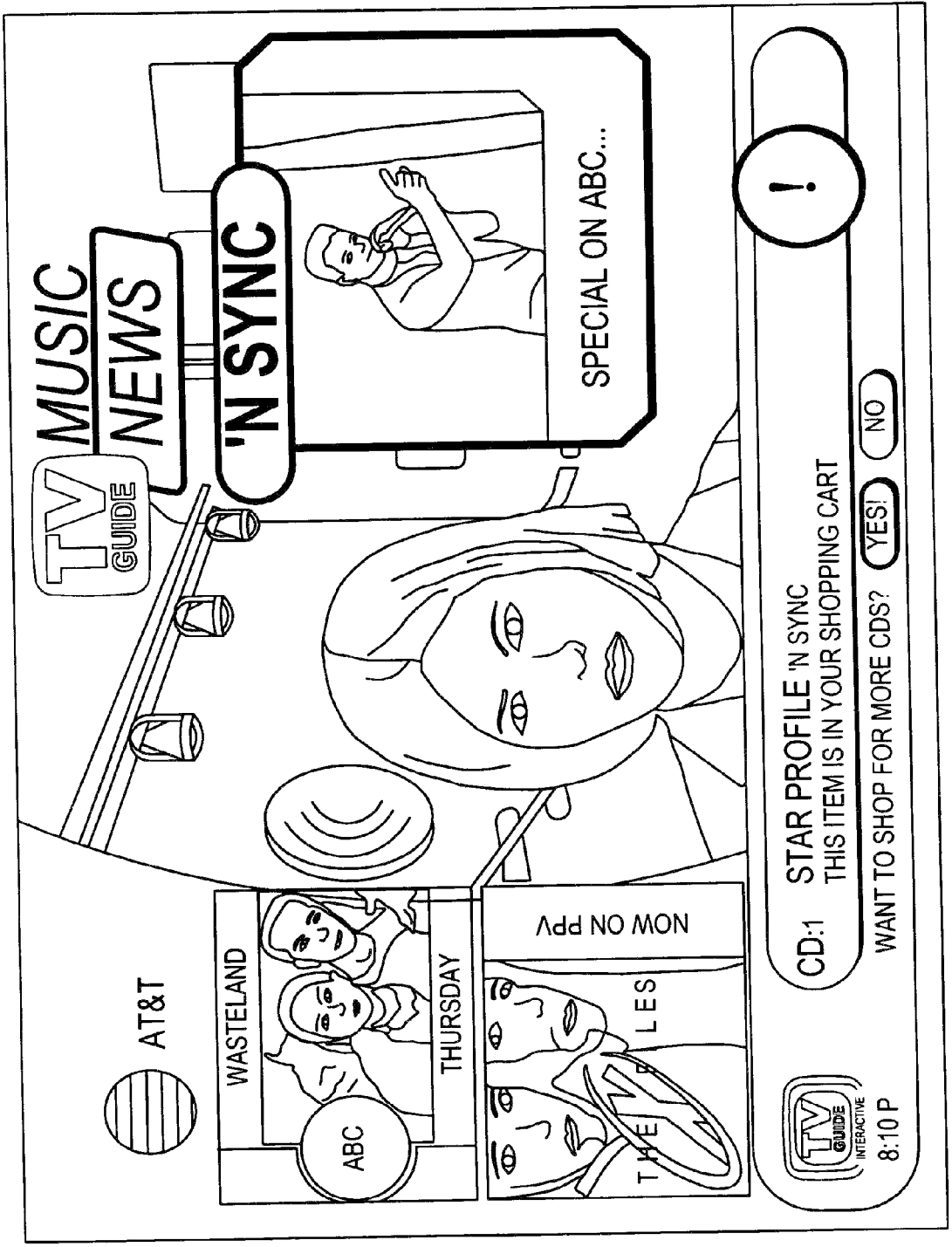

Comparing FIGS. 10a-10f illustrates how conventional television programming or passive video product promotions may be combined with interactive impulse-purchase features. As shown in FIGS. 10a and 10b, a passive video product channel includes a TV Music News segment. At some point in the segment, interactive content related to the content of the segment may be available. In this example, there may be interactive content available for 'N Sync (FIG. 10c). The interactive software may display an icon, such as alert icon 1000. In response to the user selecting alert icon 1000, the interactive software may display an interactive window. In this example, the additional information may be available merchandise (the Star Profile CD), and a point-of-purchase window 1010 may be displayed (FIG. 10d). If desired, the passive programming may be resized (as shown), and additional advertisements or other graphics may be displayed.

The user may return to full-screen video if the user does not want to order the original product or any additional products. If the user indicates a desire to order the product by, for example, selecting "Yes", the interactive software may prompt the user to add the product to a shopping cart (e.g., by selecting "No" in FIG. 10e). If desired, a suitable one-click ordering approach may be used. If the user wants to order additional products (e.g., by selecting "Yes" in FIG. 10e), the interactive software may provide the user with access to a virtual store. The store may be provided via the Internet, a private network, programmed into the interactive software, or provided using any other suitable approach. FIG. 10f shows an illustrative virtual store display screen 1030. The store may display related items for sale (e.g., other CDs by 'N Sync, other CDs by similar artists, other CDs, for the same record label, etc.) that the user may select and purchase. The store may also provide options that the user may select to view other available products.

The system may combine advertiser sponsorship with interactive impulse-purchase fulfillment. When a passive video product feature or segment is sponsored by a particular sponsor, the system may overlay an icon that alerts the user to additional information concerning, for example, the subject of the feature or segment. In response to a user selecting the icon, the system may display interactive content such as, for example, a point-of-purchase window. The products or services offered in the point-of-purchase window may be from the sponsor of the segment or feature, from a featured source, or from some other source.

Figure 11A:
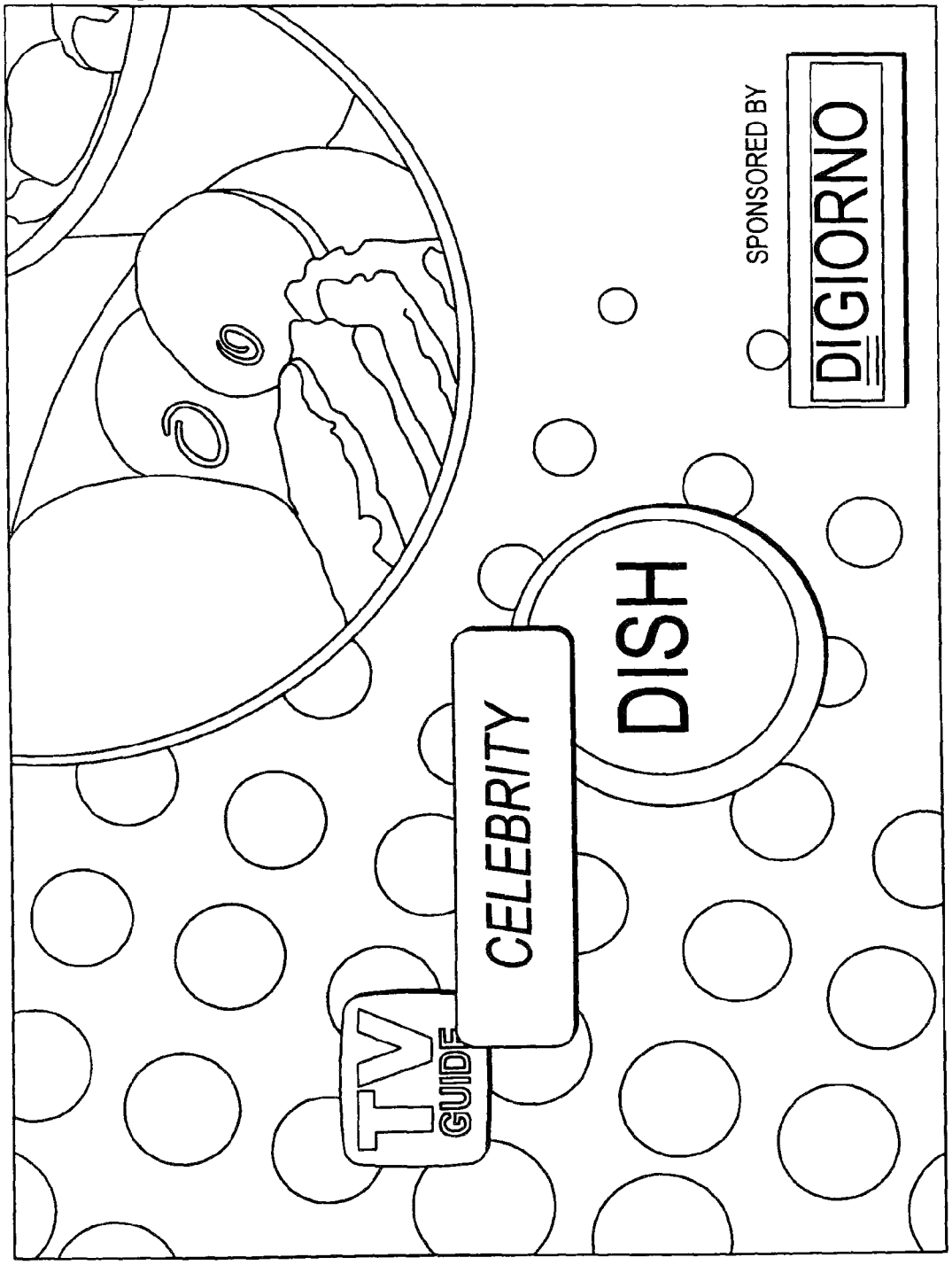
Figure 11C:
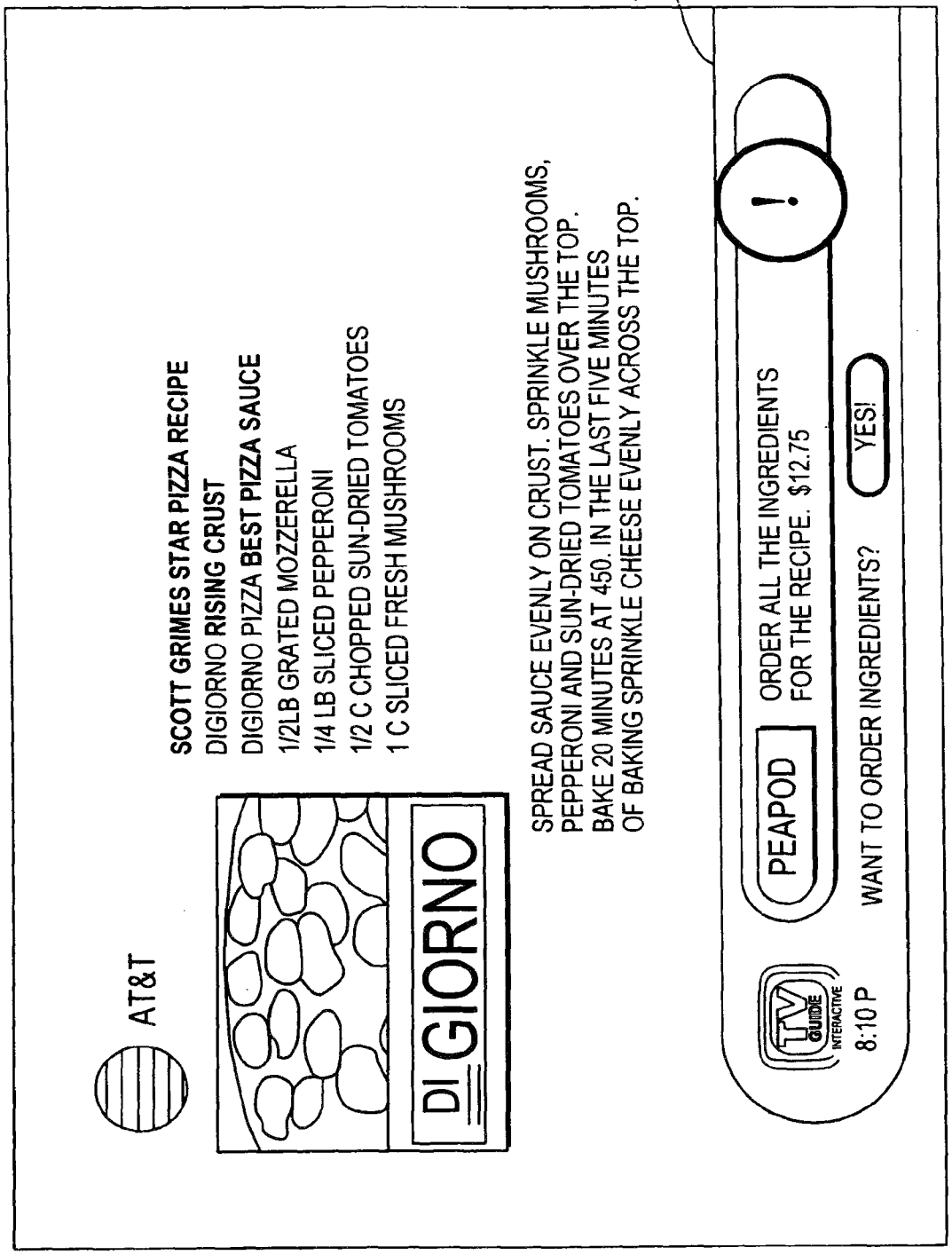

Comparing FIGS. 11a-11c illustrates how advertiser sponsorship may be combined with interactive impulse-purchase fulfillment. A passive video product segment may be sponsored, for example, by DiGiorno and feature an interview with Papa John's Pizza (FIG. 11a). If interactive content is available for the segment, interactive software may display an alert icon 1100 (FIG. 11b). In response to a user selecting alert icon 1100, the interactive software may display the interactive content. In this example, the interactive content may be a recipe for Papa John's Pizza (FIG. 11c). Point-of-purchase window 1120 may be displayed to allow the user to order products associated with the interactive content, in this example, ingredients for the recipe. Window 1120 may include an advertisement for the provider of the ingredients, in this example, Peapod Grocery Delivery Service. This approach may provide for a three-way sale of advertisements. DiGiorno, Papa John's, and Pea Pod may each advertise in connection with impulse-purchase fulfillment. Moreover, as in this example, the advertisers may be selected to be complimentary to one another and may interact synergistically, thereby enhancing the advertising value of the individual advertisements.

If desired, integrating conventional television advertising or sponsorship, interactive advertising, and impulse-purchase fulfillment may be performed using Intent-based technologies. Conventional television programming and passive video products may be augmented or otherwise coordinated with an interactive guide or other software using markup language documents, such as Hypertext Markup Language (HTML) documents. Systems in which passive video products and interactive guide content and functionality are augmented and coordinated using Intent-delivered data are described, for example, in Allison et al. U.S. patent application Ser. No. 09/368,825, filed Aug. 5, 1999, which is hereby incorporated by reference herein in its entirety.

FIGS. 12-15 are flowcharts of illustrative steps involved in providing features of one embodiment of the present invention. In practice, the steps shown in FIGS. 12-15 may be performed in any suitable order, some may be deleted, and others added. Some of the steps shown in FIGS. 12-15 involve providing users with opportunities to interact with the system, performing various processes, or providing various displays. These and other steps may be performed by, for example, a client application that is programmed to generate or download screens suitable to provide such opportunities, an Internet browser that downloads suitable pages to provide such opportunities, peer applications, or using any other suitable approach. In non-on-line arrangements, processing for these operations may be performed by a client, a server, or distributed among peer applications, depending on the chosen system implementation and the processing requirements of such operations. In on-line arrangements, such processing may be performed by user television equipment 22, personal computer 231, or Internet service systems 61 and 235, depending on, for example, the processing and storage capabilities of user television equipment 22 or personal computer 231, the chosen implementation for the interactive applications, the processing requirements of such operations, or other factors. For purpose of clarity, the following discussion will describe the steps shown in FIGS. 12-15 as being performed by "the system," which is intended to include any suitable system, such as, for example, any non-on-line or on-line arrangement suitable for performing the steps.

Figure 12:
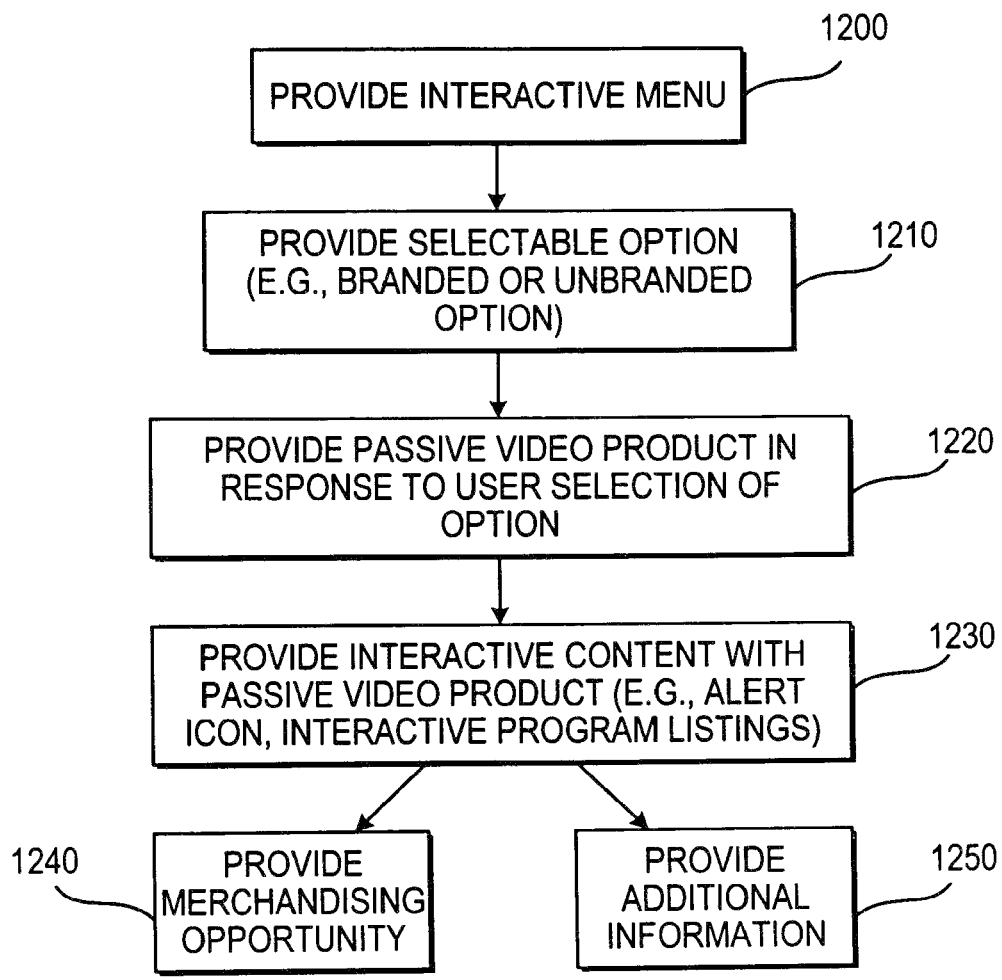
FIG. 12 is a flowchart of illustrative steps involved in providing selectable options within interactive applications that allow users to access passive video products in accordance with one embodiment of the present invention.

FIG. 12 is a flowchart of illustrative steps involved in providing selectable options within interactive applications that allow users to access passive video products (e.g., a barker channel, passive guide, or other passive video product). At step 1200, the system may provide an interactive menu of options such as, for example, an interactive program guide, home shopping, or other menu. The interactive menu may include a selectable option for the passive video product (step 1210). The option may be branded to indicate the name or source of the passive video product (e.g., branded "The TV Guide Channel" as shown in FIG. 5).

At step 1220, the system may provide the passive video product to a user in response to the user selecting the option. Providing the passive video product may be accomplished using any suitable approach. For example, the system may tune the user's television equipment to a digital or analog television channel carrying the passive video product. In another suitable approach, for example, the system may access an Internet site that provides a real-time passive video product (i.e., a passive product that is not provided on-demand, as opposed to other types of content on the Internet).

At step 1230, the system may provide interactive content with the passive video product. The system may, for example, provide an alert icon. In response to the user selecting the alert icon or otherwise indicating a desire to access interactive content, the system may provide the user with a merchandising opportunity to, for example, purchase products related to what is showing in the passive video product (step 1240). In another approach, the system may provide additional information for the passive video product such as, for example, descriptions, reviews, or any other suitable information (step 1250). The interactive content provided at step 1230 may include, for example, interactive television program listings. In one suitable approach, the system may overlay interactive program listings over a passive program guide to provide a hybrid guide. The system may provide additional information for a selected listing (step 1250).

Figure 13:
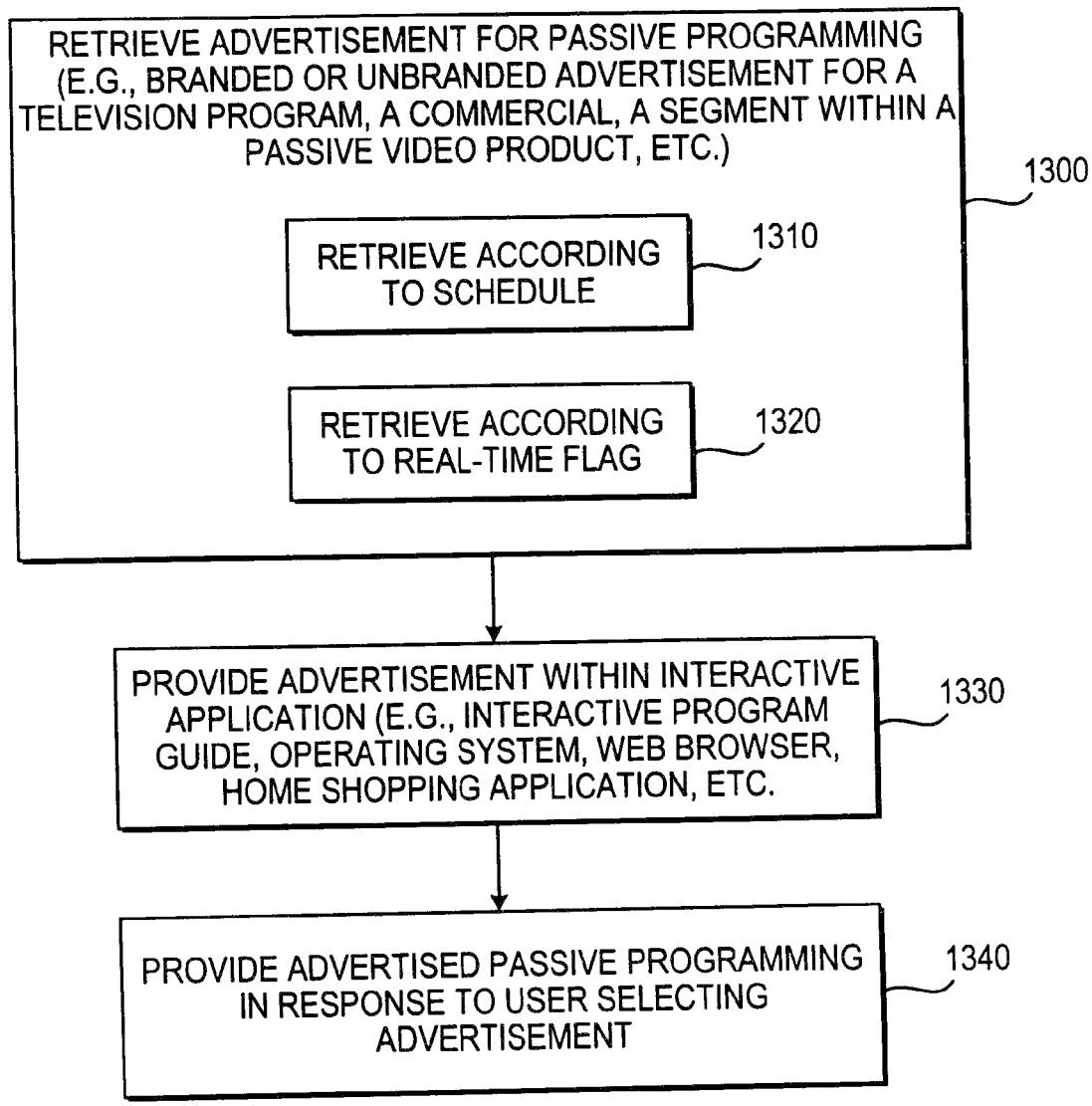
FIG. 13 is an illustrative flowchart of steps involved in providing advertisements for passive programming from interactive applications in accordance with one embodiment of the present invention.

FIG. 13 is an illustrative flowchart of steps involved in providing advertisements for passive 25 programming from interactive applications. At step 1300, the system may retrieve advertisements for passive programming. The passive programming may be any suitable passive programming such as, for example, television programs, pay-per-view programs, commercials, segments within passive video products, or any other suitable passive programming. The advertisements may include any suitable content such as, for example, text, graphics, audio, video, animations, other suitable content, or any suitable content thereof. The advertisements may be branded—i.e., they may include brands or logos for sponsors. For example, the advertisement for the Insider segment, as shown in FIG. 9a, is branded by Miller Lite. The system may retrieve advertisements using any suitable approach. For example, the system may retrieve advertisements according to a schedule (step 1310), according to a real-time flag (step 1320), using a combination of these approaches, or any other suitable approach, from local memory or from a remote server.

At step 1330, the system provides retrieved advertisements within an interactive application. The interactive application may be any suitable interactive application such as, for example, an interactive program guide, a home shopping application, operating system software, a web browser, or any other suitable interactive application. The advertisement may be provided as, for example, a panel advertisement, a banner advertisement, a full-screen advertisement, or using any other suitable format. The system provides the advertised passive programming at step 1340. Providing the advertised passive programming may be accomplished using any suitable approach. For example, the system may tune the user's television equipment to a television channel carrying the passive programming. In another suitable approach, for example, the system may access an Internet site that provides the passive programming in real time.

Figure 14:
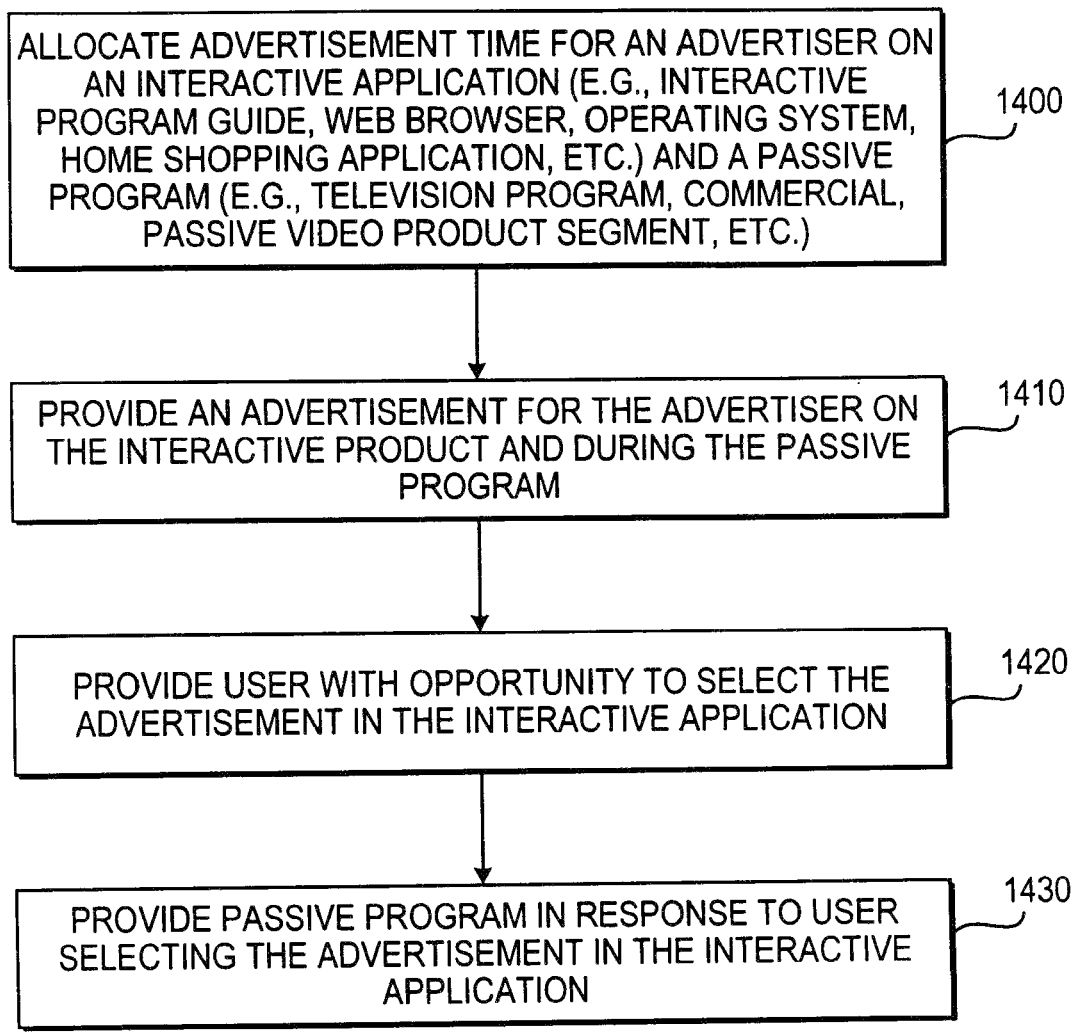
FIG. 14 is a flowchart of illustrative steps involved in providing advertisements for advertisers during passive programming and from within interactive applications in accordance with one embodiment of the present invention.

FIG. 14 is a flowchart of illustrative steps involved in providing advertisements for advertisers during passive programming and from within interactive applications. At step 1400, the system may allocate advertisement time for an advertiser on at least one interactive product (e.g., interactive television program guide, operating system, web browser, home banking application, or other suitable interactive application) and at least one passive program (e.g., television program, pay-per-view program, movie, passive guide channel or barker channel segment, or other suitable programming). At step 1410, the system may provide an advertisement for the advertiser simultaneously on the interactive product and during the passive program. This may allow the system provider to sell advertisers advertisement time across multiple platforms or products. The advertiser may brand the program and the advertisement within the interactive application.

At step 1420, the system may provide the user with an opportunity to select the advertisement in the interactive product. At step 1430, the system provides the advertised passive program in response to the user selecting the advertisement in the interactive application. The system may provide the advertised passive program using any suitable approach. For example, the system may tune the user's television equipment to a television channel carrying the passive programming. In another suitable approach, for example, the system may access an Internet site that provides the passive programming in real time.

Figure 15:
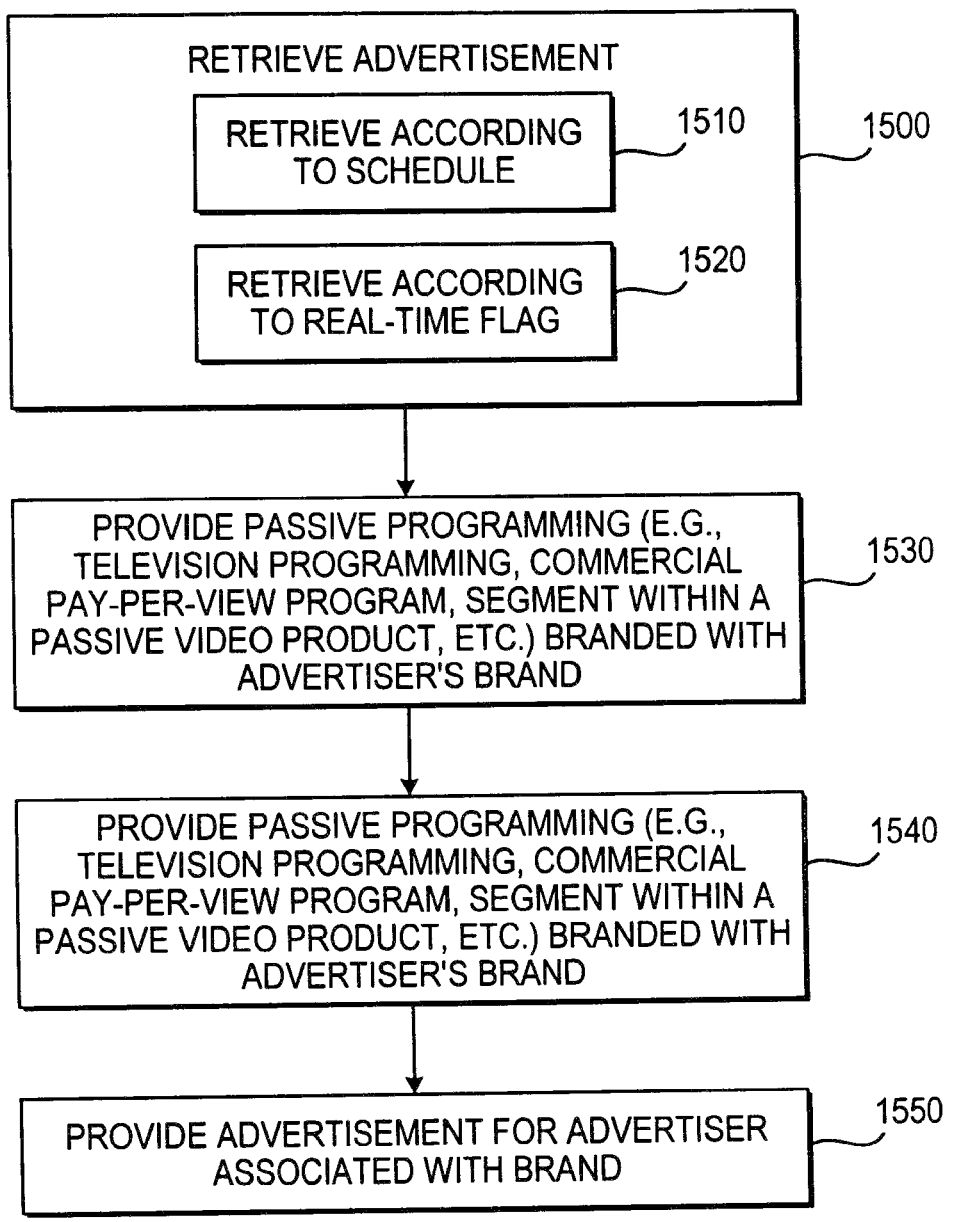
FIG. 15 is a flowchart of illustrative steps involved in providing advertisements for advertisers within interactive applications based on branded passive programming in accordance with one embodiment of the present invention.

FIG. 15 is a flowchart of illustrative steps involved in providing advertisements for advertisers within interactive applications based on branded passive programming. The steps shown in FIG. 15 provide for advertisements within interactive applications based on the branding of passive programming. At step 1500, the system may retrieve advertisements. The advertisements may include any suitable content such as, for example, text, graphics, audio, video, animations, other suitable content, or any suitable combination thereof. The advertisements may be retrieved using any suitable approach. For example, the system may retrieve advertisements according to a schedule (step 1510), according to a real-time flag (step 1520), using a combination of these approaches, or any other suitable approach, from local memory or a remote server.

At step 1530, the system may provide passive programming branded with an advertiser's brand. The programming may be branded by the source of the programming, main facility 12, distribution facility 16, Internet service system 235, or at any other suitable facility. At step 1540, the system may provide a user with an opportunity to access interactive information provided from an interactive application such as, for example, an interactive television program guide, a web browser, an operating system, a home shopping application, or other suitable interactive application. The system may, for example, provide a selectable or non-selectable icon that indicates the availability of interactive information associated with the programming. In addition to the interactive information, the interactive application may provide an advertisement for the advertiser associated with the brand on the branded passive programming (step 1550).

Thus, systems and methods for coordinating interactive and passive advertisements and merchandising opportunities are provided. One skilled in the art will appreciate that the present invention can be practiced by other than the described embodiments, which are presented for purposes of illustration and not of limitation, and the present invention is limited only by the claims which follow.

What is claimed is:

1. A method for coordinating sponsor information between an interactive programming guide and a plurality of videos, the method comprising:

generating for display the interactive programming guide, wherein the interactive programming guide allows a user to navigate through a plurality of program listings;

accessing a memory that stores associations between the plurality of videos scheduled to be broadcast and advertisements for the plurality of videos for display in the interactive programming guide;

receiving a flag transmitted in a header of a video of the plurality of videos containing an indication that an advertisement from a particular advertiser for the video of the plurality of videos should be retrieved;

in response to receiving the flag, identifying, using a processor and based on the indication in the flag and the associations stored in the memory, the video of the plurality of videos and the advertisement for the video of the plurality of videos for display in the interactive programming guide, wherein the advertisement for the video of the plurality of videos includes first information about a non-broadcaster sponsor of the video of the plurality of videos;

retrieving the advertisement;

generating for display in the interactive programming guide, the advertisement for the video of the plurality of videos;

receiving a user input at the interactive programming guide selecting the advertisement; and in response to receiving the user input, generating, for simultaneous display, the video of the plurality of videos and second information about the sponsor.

2. The method of claim 1, wherein the video of the plurality of videos comprises a television program, a pay-per-view program, a commercial, or a segment within a passive video product.

3. The method of claim 1, wherein the video of the plurality of videos and the sponsor associated with the video of the plurality of videos are identified in response to an advertisement schedule.

4. The method of claim 1, wherein the first information about the sponsor is overlaid on the information about the video.

5. The method of claim 1, wherein the first information about the sponsor includes a logo of the sponsor.

6. The method of claim 1, further comprising:
receiving the second information about the sponsor from an Internet source.

7. The method of claim 1, wherein the second information about the sponsor is overlaid on the video of the plurality of videos.

8. The method of claim 1, wherein the advertisement is provided by a web browser.

9. The method of claim 1, wherein generating for display the second information about the sponsor comprises accessing an Internet site.

10. A system for coordinating sponsor information between an interactive programming guide and a plurality of videos, the system comprising:
a memory that stores associations between the plurality of videos scheduled to be broadcast and advertisements for the plurality of videos for display in the interactive programming guide; and
a processor, communicatively coupled to the memory and in communication with a display device and a user selection device, configured to:
generate for display the interactive programming guide, wherein the interactive programming guide allows a user to navigate through a plurality of program listings;
access the associations stored in the memory;
receive a flag transmitted in a header of a video of the plurality of videos containing an indication that an advertisement from a particular advertiser for the video of the plurality of videos should be retrieved;
in response to receiving the flag, identify, based on the indication in the flag and the associations stored in the memory, the video of the plurality of videos and the advertisement for the video of the plurality of videos for display in the interactive programming guide, wherein the advertisement for the video of the plurality of videos includes first information about a non-broadcaster sponsor of the video of the plurality of videos;
retrieve the advertisement;
generate for display in the interactive programming guide the advertisement for the video of the plurality of videos;
receive a user input at the interactive programming guide selecting the advertisement; and
in response to receiving the user input, generate, for simultaneous display, the video of the plurality of videos and second information about the sponsor.

11. The system of claim 10, wherein the memory is remote from the processor.

12. The system of claim 10, wherein the video of the plurality of videos and the sponsor associated with the video of the plurality of videos are identified in response to an advertisement schedule.

13. The system of claim 10, wherein the first information about the sponsor is overlaid on the information about the video.

14. The system of claim 10, wherein the first information about the sponsor includes a logo of the sponsor.

15. The system of claim 10, further comprising an Internet access device in communication with the processor, and wherein the processor is further configured to receive the second information about the sponsor from an Internet source.

16. The system of claim 10, wherein the second information about the sponsor is overlaid on the video of the plurality of videos.

17. The system of claim 10, wherein the advertisement is provided by a web browser executed by the processor.

18. The system of claim 10, further comprising an Internet access device in communication with the processor, wherein generating for display the second information about the sponsor comprises accessing an Internet site.

* * * * *